US007859715B2

(12) United States Patent
Yamamoto et al.

(10) Patent No.: US 7,859,715 B2
(45) Date of Patent: Dec. 28, 2010

(54) PRINTING CONTROL DEVICE, PRINTING CONTROL METHOD, AND MEDIUM RECORDING PRINTING CONTROL PROGRAM

(75) Inventors: Yuko Yamamoto, Nagano-ken (JP); Yoshifumi Arai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 924 days.

(21) Appl. No.: 10/938,070

(22) Filed: Sep. 10, 2004

(65) Prior Publication Data
US 2005/0219569 A1  Oct. 6, 2005

(30) Foreign Application Priority Data
Sep. 11, 2003  (JP) .............................. 2003-319695

(51) Int. Cl.
*H04N 1/52* (2006.01)
(52) U.S. Cl. .................... 358/1.9; 358/521; 358/534; 358/3.23
(58) Field of Classification Search ................ 358/1.8, 358/1.9, 521, 534, 523, 3.23, 1.1, 1.13; 347/1–109; 345/589–590
See application file for complete search history.

(56) References Cited

U.S. PATENT DOCUMENTS

| 6,412,934 B1 * | 7/2002 | Moriyama et al. ............ 347/96 |
| 6,796,629 B2 * | 9/2004 | Komatsu et al. .............. 347/15 |
| 7,268,897 B1 * | 9/2007 | Moro et al. ................ 358/1.13 |
| 2002/0191046 A1 * | 12/2002 | Otsuki ........................ 347/43 |
| 2002/0196457 A1 * | 12/2002 | Nunokawa ................ 358/1.13 |
| 2003/0218656 A1 * | 11/2003 | Yamazaki et al. ............. 347/43 |

FOREIGN PATENT DOCUMENTS

| JP | 08-072230 | * | 3/1996 |
| JP | 08072230 | * | 3/1996 |
| JP | 08-216434 | | 8/1996 |
| JP | 08216434 | * | 8/1996 |

OTHER PUBLICATIONS

Onishi Toshiyuki, English translation.*
Abstract of Japanese Patent Publication No. 08-072230, Pub. Date: Mar. 19, 1996, Patent Abstracts of Japan.
Abstract of Japanese Patent Publication No. 08-216434, Pub. Date: Aug. 27, 1996, Patent Abstracts of Japan.

* cited by examiner

*Primary Examiner*—King Y Poon
*Assistant Examiner*—Iriana Cruz
(74) *Attorney, Agent, or Firm*—Martine Penilla & Gencarella, LLP

(57) ABSTRACT

A second printing control unit is provided. If the setting information is the information of setting for avoiding the use of Cl ink (uncolored ink), the second printing control unit refers to the same color conversion table as is used by a first printing control unit. Thereby the second printing control unit color-converts input image data into image data comprising gradation data corresponding to at least the amounts of colored inks in C, M, Y, R, V, and K consumed. The second printing control unit can carry out such control as to cause a printer (printing device) to use only the C, M, Y, R, V, and K colored ink and print a print image, using the image data.

7 Claims, 12 Drawing Sheets

| R | G | B | C | M | Y | R | V | K | Cl |
|---|---|---|---|---|---|---|---|---|---|
| 0 | 0 | 0 | 0 | 0 | 0 | 0 | 0 | 255 | 0 |
| | ⋮ | | | | | ⋮ | | | |
| 255 | 255 | 255 | 0 | 0 | 0 | 0 | 0 | 0 | 255 |

D11 ⟵⎯⎯⎯⎯⎯⟶  D12

When Cl ink is used

Image data after color conversion (by color)

Gradation data D21

Dot amount data D22
(Multi-step gradation)

Processing of conversion of number of gradation steps

Half tone data (by color and by dot)

2-step gradation data D23

PRINTING CONTROL DEVICE, PRINTING CONTROL METHOD, AND MEDIUM RECORDING PRINTING CONTROL PROGRAM

BACKGROUND OF THE INVENTION

1. Field of the Invention

The present invention relates to a printing control device, a printing control method, and a medium recording printing control program wherein a printing device which prints print images on printing media using colored ink containing coloring material and uncolored ink containing no coloring material is controlled.

2. Description of the Related Art

There are a wide variety of printing media. For example, such media as glossy paper and plain paper different in gloss exist. Glossy paper is used for high-quality print of photos and the like, and plain paper is used when the best image quality is not required. In some inks, the degree of gloss varies depending on the amount of ink injected, and glossy paper can become lacking in the uniformity of gloss. To cope with this, uncolored ink containing no coloring material is used together with colored ink to improve the glossy appearance of print images. As colored ink, cyanic ink C, magenta ink M, yellow ink Y, black ink K, and the like are used.

A technique wherein whether to discharge treating liquid is controlled by the user's choice is known. The treating liquid (uncolored ink) is for insolubilizing colored ink, and is discharged through nozzles for discharging the treating liquid onto an agent on which ink is to be recorded (printing medium). (Refer to Japanese Unexamined Patent Publication No. Hei 8(1996)-72230.)

A technique wherein the recording mode is changed as required when recording is carried out is also known. Recording mode a and recording mode c are provided. In recording mode a, recordability enhancement liquid (uncolored ink) is discharged to the entire recorded images, and in recording mode c, recordability enhancement liquid is not discharged. (Refer to Japanese Unexamined Patent Publication No. Hei 8(1996)-216434.)

RGB data is for representing the output images of a display by gradation data with respect to each of component colors R (Red), G (Green), and B (Blue). CMYKCl data is for representing images by gradation data with respect to each of component colors C, M, Y, and K corresponding to colored ink used in a printing device and achromatic Cl corresponding to uncolored ink. When RGB data is color-converted into CMYKCl data and a printing device is controlled using the CMYKCl data, color conversion tables (color conversion LUTs) are used in color conversion. These LUTs hold gradation data for each of C, M, Y, and K, and is provided with a large amount of data corresponding to, for example, 17 lattice points with respect to each of R, G, and B ($17^3$ points in total). If an attempt is made to provide print mode in which uncolored ink is used and print mode in which uncolored ink is not used, the following procedure must be taken: different LUTs are prepared for respective print modes, and stored beforehand on a predetermined recording medium, such as a hard disk.

SUMMARY OF THE INVENTION

The present invention has been made with the above problem taken into account. An object of the present invention is to provide a printing control device, a printing control method, and a printing control program wherein in a printing device which can use uncolored ink, the optimum amount of uncolored ink can be used for colored ink and further, if uncolored ink is not used, the storage capacity for color conversion tables can be reduced with little influence on the colors of print images.

To attach the above object, an aspect of the present invention is a printing control device which controls a printing device so designed that it prints print images on printing media using colored ink and uncolored ink (hereafter, referred to also as "both ink types"). This printing control is carried out according to setting information which indicates the setting of whether the uncolored ink may be used or not. The printing control device comprises: a first printing control unit and a second printing control unit which refer to color conversion tables and thereby color-converts input image data. Further, the printing control units carry out control to cause a printing device to print print images using image data obtained as the result of color conversion. The input image data is image data comprising gradation data corresponding to a plurality of component colors. The color conversion table is a table which defines the correspondence between two types of gradation data: gradation data corresponding to a plurality of the component colors and gradation data corresponding to the amounts of both ink types consumed.

If setting information is the information of setting for using uncolored ink, the first printing control unit refers to the color conversion table. Thereby, it color-converts input image data into image data comprising gradation data corresponding to both ink types. Then, using the image data corresponding to both ink types obtained as the result of color conversion, control is carried out so as to cause the printing device to print print images using both ink types.

If setting information is the information of setting for avoiding the use of uncolored ink, the second printing control unit refers to the same color conversion table. Thereby, it color-converts input image data into image data comprising gradation data corresponding to at least the amounts of colored ink consumed. Then, using the image data corresponding to at least colored ink obtained as the result of color conversion, control can be carried out so as to prevent the printing device from using uncolored ink and cause it to print print images using only colored ink.

If a printing device that can use uncolored ink is prevented from using uncolored ink, the colors of print images are hardly influenced. Therefore, with the above constitution, the optimum amount of uncolored ink can be used for colored ink, and, if uncolored ink is not used, the colors of print images are hardly influenced. Regardless of whether uncolored ink may be used or not, color conversion tables to be referred to can be shared, and thereby the storage capacity for color conversion tables can be reduced.

The above colored ink may be ink which is prepared by mixing chromatic coloring materials in solvents and looks to be chromatic colors when recorded on a printing medium. Like the mixed solvent of water and water soluble organic solvent, the above solvent may be aqueous or oily. The coloring material contained in colored ink may be coloring material (coloring agent) such as water soluble dye or may be color material (colorant) such as insoluble or hardly soluble pigment or dye. The color material (colorant) is also included in the coloring material referred to in the present invention.

The uncolored ink only has to be free from coloring material. For example, it may be composed of the same solvent as that of colored ink. Or, it may be glossy appearance improvement ink that can improve the glossy appearance of print images printed only in colored ink. Use of the improvement ink provides the same gloss as colored ink does; therefore, the improvement ink is preferable. The improvement ink may be ink prepared by adding a cerium oxide ultraviolet absorbing agent to a liquid medium, as disclosed in Japanese Unexamined Patent Publication No. Hei 8(1996)-60059. Or, it may be ink prepared by adding an organic water soluble ultraviolet absorbing agent to a liquid medium. Or, it may be ink prepared by adding a component which insolubilizes or agglutinates the coloring material of colored ink to a liquid medium. (For example, if the coloring material is an anionic compound, a cationic substance is added.) These inks make it possible to reduced lack in the uniformity of gloss in glossy paper and enhance its water resistance and light resistance.

For uncolored ink, a colorless ink which does not contain coloring material and is thus clear and colorless can be adopted. The uncolored ink includes inks which are pale colors that have little influence on the colors of print images because of their solvent or their component for the insolubilization or the like of the above coloring material.

As a second example, the following constitution may be adopted: the input of an order specifying whether to cause the printing device to use the above uncolored ink or not is accepted. Then, information corresponding to the accepted input of the order is taken as the above setting information. Since orders specifying whether to make uncolored ink used or not can be inputted, the user-friendliness can be enhanced. Various order inputs are possible. For example, orders may be inputted through the operation of the user or may be inputted from application programs (APLs).

As a third example, the following constitution may be adopted: the second printing control unit refers to the above identical color conversion table. Thereby, it color-converts the input image data into image data comprising gradation data corresponding only to the colored ink. Then, using the image data, the second printing control unit causes the printing device to print the print images using only the colored ink. Thus, it becomes unnecessary to perform processing for uncolored ink in half tone processing or processing after color conversion, such as and rasterize processing. Therefore, the processing speed in printing control can be enhanced.

As a fourth example, the following constitution may be adopted: it is assumed that the above identical color conversion table holds gradation data for the colored corresponding to the amounts of the colored ink consumed and gradation data for the colorless corresponding to the amount of the uncolored ink consumed. In this case, the second printing control unit refers to the color conversion table, and thereby acquires gradation data for the colored corresponding to the input image data. Then, it generates image data posterior to color conversion only from the gradation data for the colored. Thus, processing for uncolored ink becomes unnecessary also in color conversion processing. Therefore, the processing speed in printing control can be further enhanced.

Even if uncolored ink is not used, the colors of print images are hardly influenced. Therefore, the second printing control unit refers to the identical color conversion table. Thereby, it color-converts the input image data into image data comprising gradation data corresponding to at least the amounts of the colored ink consumed. Then, the second printing control unit does not allocate the gradation data corresponding to the amount of the uncolored ink consumed to the gradation data corresponding to the colored ink. Instead, it immediately performs the same processing immediately after color conversion as the first printing control unit on the image data. Thereby, the second printing control unit can cause the printing device to carry out control so as to print the print images using only the colored ink. That is, whether to use only uncolored ink or not is set, and thus the processing of printing control is not complicated and the processing speed in printing control is enhanced.

As a fifth example, the following constitution may be adopted: it is assumed that the above printing device is so designed that it forms dots on printing media using both ink types and thereby prints print images. In this case, the second printing control unit performs the half tone processing only on the following of image data obtained as the result of color conversion comprising gradation data corresponding to the amounts of both ink types consumed: gradation data corresponding to the amounts of the colored ink consumed. Thereby, it generates data indicating the state of formation of dots of only the colored ink. Using the data, the second printing control unit causes the printing device to form dots of only the colored ink to print the print images. Thus, it can be possible to avoid making gradation data for the uncolored ink obtained as the result of color conversion used in the processing after color conversion. Then, the color conversion processing performed by the first printing control unit and that performed by the second printing control unit can be made identical with each other. Therefore, color conversion processing can be simplified, and further the processing for the uncolored ink becomes unnecessary in half tone processing and the processing after color conversion, such as rasterize processing. As a result, the processing speed in printing control can be enhanced.

Various types of the half tone processing are possible. For example, half tone processing wherein gradation errors after conversion of number of gradation steps are diffused into other pixels as in error diffusion method is possible. Half tone processing wherein conversion of number of gradation steps is carried out using predetermined dither matrixes as in dither method is possible. Various types of data are possible for data indicating the state of formation of dots. Two-valued data is possible, and many-valued data, such as four-valued data, is possible.

As a sixth example, the following constitution may be adopted: the second printing control unit performs the identical half tone processing on the image data obtained as the result of color conversion comprising gradation data corresponding to the amounts of both ink types consumed. Thereby, it generates data indicating the state of formation of dots of both ink types. Using only the data corresponding to the colored ink of these data, the second printing control unit causes the printing device to form dots of only the colored ink to print the print images. Thus, it can be possible to avoid making data for the uncolored ink obtained as the result of half tone processing used in the processing after half tone processing. Then, the color conversion processing and half tone processing performed by the first printing control unit and those performed by the second printing control unit can be made identical with each other. Therefore, these processing can be simplified. Further, the processing for the uncolored ink becomes unnecessary in the processing after half tone processing, such as rasterize processing; therefore, the processing speed in printing control can be enhanced.

As a seventh example, the following constitution may be adopted: it is assumed that the printing device is a device so designed that it is fed with raster data indicating the state of formation of dots on a raster-by-raster basis; then, it forms dots corresponding to the raster data on printing media with respect to each raster using both ink types and thereby prints print images. In this case, the second printing control unit performs the above identical half tone processing on the image data obtained as the result of color conversion comprising gradation data corresponding to the amounts of both ink types consumed. Thereby, it generates data indicating the state of formation of dots of both ink types. Then, the second printing control unit performs the identical rasterize processing on the data, and thereby generates raster data indicating the state of formation of dots of both ink types with respect to each of the above rasters. Then, it outputs only raster data corresponding to the colored ink of these raster data to the printing device. Thereby, the second printing control unit causes the printing device to form dots of only the colored ink to print the print images. Thus, it can be possible to avoid passing raster data for the uncolored ink to the printing device. Then, the color conversion processing, half tone processing, and rasterize processing performed by the first printing control unit and those performed by the second printing control unit can be made identical with each other. Therefore, programs for printing control to make uncolored ink used can be used substantially without change to simplify these processing. Therefore, if uncolored ink is not used, the storage capacity for color conversion tables can be reduced with little influence on the colors of print images through a simple constitution.

Various types of the rasterize processing are possible. Microwave processing is possible, and processing based on band feed is also possible.

As an eighth example, the following constitution may be adopted: the second printing control unit refers to the identical color conversion table. Thereby, it color-converts the input image data into image data comprising gradation data corresponding to the amounts of the colored ink and uncolored ink consumed. The second printing control unit replaces only the gradation data corresponding to the amount of the uncolored ink consumed of these image data with gradation data in which the uncolored ink is not used. Thereby, it generates image data in which the uncolored ink is prevented from being used. Using the image data, the second printing control unit causes the printing device to print the print images using only the colored ink. Thus, the color conversion processing, half tone processing, and rasterize processing performed by the first printing control unit and those performed by the second printing control unit can be made identical with each other. Therefore, programs for printing control to make uncolored ink used can be used substantially without change to simplify these processing. Therefore, if uncolored ink is not used, the storage capacity for color conversion tables can be reduced with little influence on the colors of print images through a simple constitution.

From the foregoing, the following can be said: the fourth constitution example is more useful than the fifth, sixth, seventh, and eighth constitution examples in that color conversion processing can be speeded; the third, fourth, and fifth constitution examples are more useful than the sixth, seventh, and eighth constitution examples in that half tone processing can be speeded; the third, fourth, fifth, and sixth constitution examples are more useful than the seventh and eighth constitution examples in that rasterize processing can be speeded. The seventh and eighth constitution examples are more useful than the third, fourth, fifth, and sixth constitution examples in that rasterize processing can be made identical and simplified by the reduction of branching and the like. The sixth, seventh, and eighth constitution examples are more useful than the third, fourth, and fifth constitution examples in that half tone processing can be made identical and simplified by the reduction of branching and the like. The fifth, sixth, seventh, and eighth constitution examples are more useful than the fourth constitution example in that color conversion processing can be made identical and simplified by the reduction of branching and the like.

The above-mentioned device may be incorporated into some equipment and embodied together with other methods. Thus, the philosophy of the present invention can be implemented in various embodiments, and the embodiments of the present invention can be modified as appropriate. The processing can be performed in accordance with predetermined procedures corresponding to the above embodiments. Therefore, the present invention is applicable as a control method, and the control method basically produces the same action and effect. The present invention is applicable also as a printing system equipped with a printing unit which forms dots to print images corresponding to image data, and the printing system basically produces the same action and effect.

When the present invention is embodied, there are cases where a predetermined control program is executed on the above device. This printing control program also basically produces the same action and effect. Further, it is possible that a medium recording the above program is distributed and the program is loaded from this recording medium to a computer as appropriate. Therefore, the present invention is applicable also as a computer readable recording medium recording the program, and this medium basically produces the same action and effect. Further, also as a printing control program product, the present invention basically produces the same action and effect.

Needless to add, the second to eighth constitution examples can be adapted to the above method, program, recording medium, or program product.

DETAILED DESCRIPTION

Embodiments of the present invention will be described below in the following order:

(1) Configuration of Printing System in First Embodiment:

(2) Configuration of Printing Control Device:

(3) Details of Processing Performed by Printing Control Device:

(4) Second Embodiment:

(5) Third Embodiment:

(6) Fourth Embodiment:

(7) Fifth Embodiment:

(1) Configuration of Printing System in First Embodiment

Figure 1:
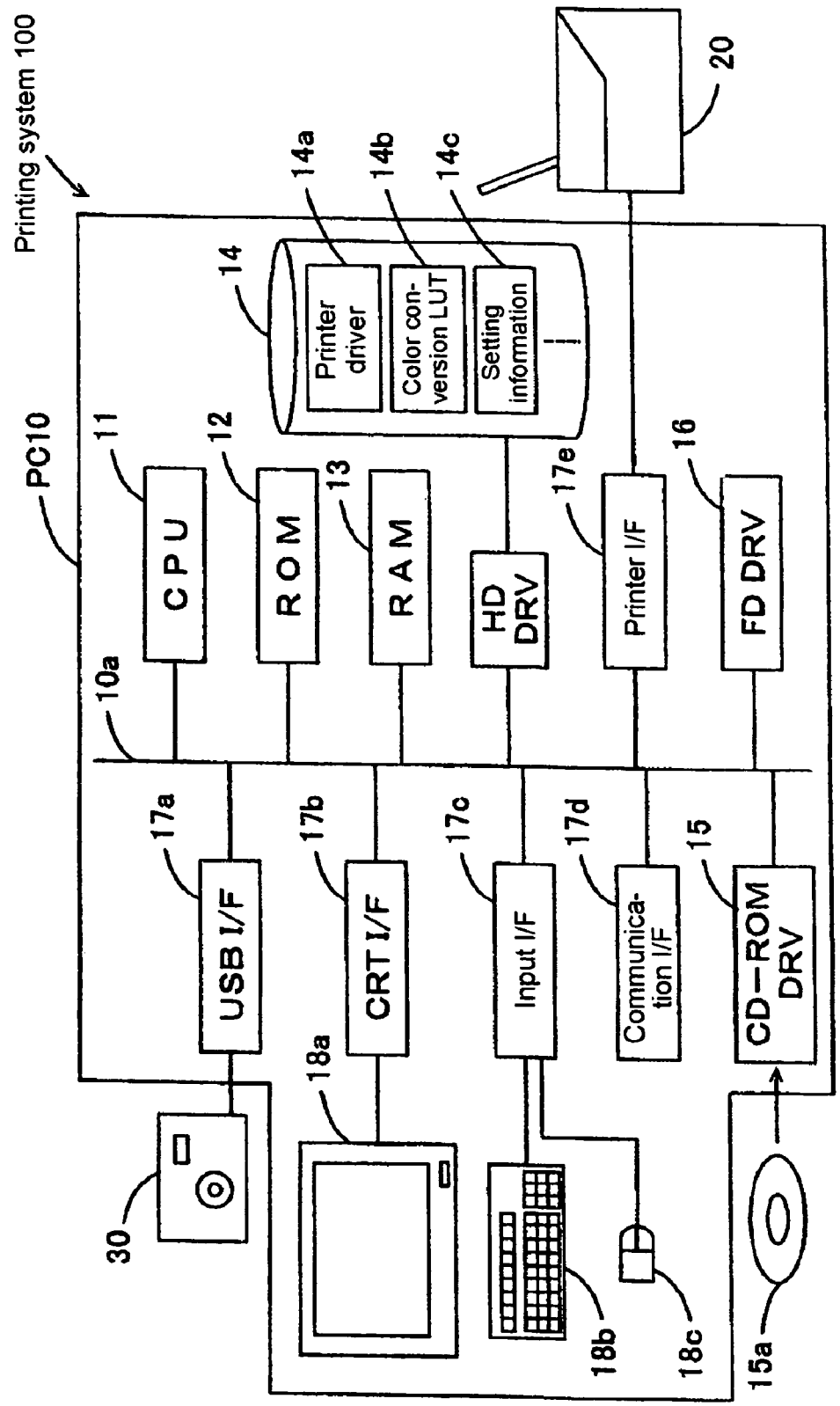
FIG. 1 is a block diagram schematically illustrating the configuration of a printing system in a first embodiment.

FIG. 1 illustrates a printing system 100 comprising: a personal computer (PC) 10 which is a printing control device referred to in the present invention; an ink jet printer 20 as a printing device (printing unit) which can print in color; and the like. Needless to add, the computer used in the present invention is not limited to PC. In the PC 10, CPU 11 which serves as the nerve center of computation controls the entire PC through a system bus 10a. The bus 10a is connected with ROM 12, RAM 13, CD-ROM drive 15, a flexible disk (FD) drive 16, various interfaces (I/Fs) 17a to 17e, and the like, and is also connected with a hard disk (HD) 14 through a hard disk drive.

The HD 14 stores an operating system (OS), APLs, and the like, which are transferred to the RAM 13 by the CPU 11 as appropriate when executed. The HD 14 also stores: a printer driver 14a which is a printing control program referred to in the present invention; color conversion tables (color conversion LUTs) 14b; gradation conversion tables (gradation conversion LUTs) (not shown): and setting information 14c referred to in the present invention. USB I/F 17a can be connected with a digital camera 30 or the like, and CRT I/F 17b is connected with a display 18a which displays images corresponding to image data based on the color image data. An input I/F 17c is connected with a keyboard 18b and a mouse 18c as input devices for operation, and a printer I/F 17e is connected with a printer 20 through, for example, a parallel I/F cable (serial I/F cable is also acceptable).

Figure 2:
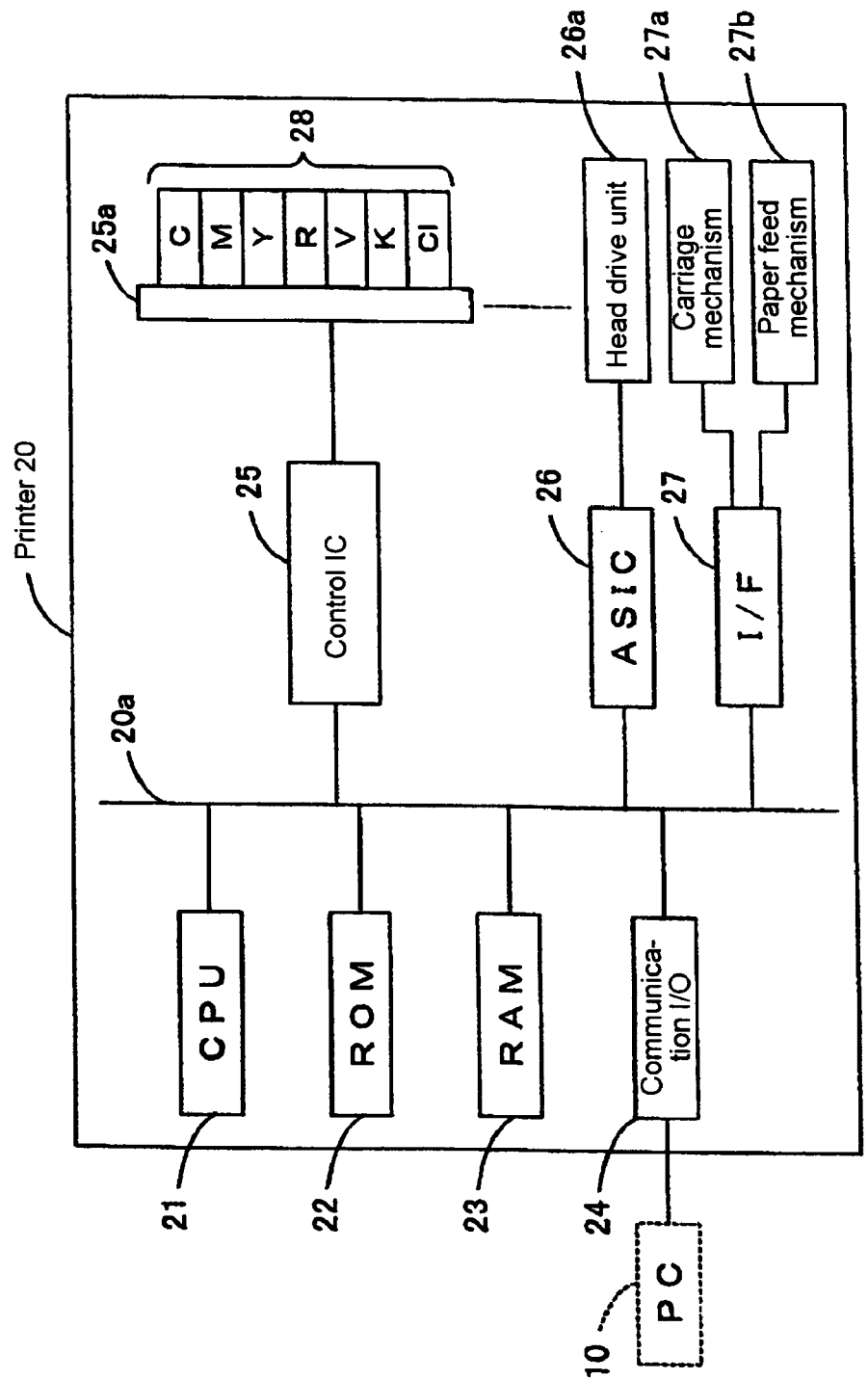
FIG. 2 is a block diagram schematically illustrating the configuration of a printer.

The printer 20 illustrated in FIG. 2 uses inks in six colors: C, M, and Y as colored inks containing coloring material; red ink R (different from R in RGB data); violet V ink V; and K. In addition, the printer 20 uses a single kind of colorless ink, Cl as an uncolored ink (glossy appearance improvement ink) containing no coloring material. The printer 20 forms dots on printing paper (printing media) and thereby prints print images corresponding to image data. In the following description, Cl may be described as one color for convenience of explanation. The C ink is high in spectral reflectance for the wavelength of 450 to 500 nm or so; the Y ink is high in spectral reflectance for the wavelength of 500 to 700 nm or so; and the M ink is high in spectral reflectance for the wavelengths of 400 to 500 nm or so and 600 to 700 nm or so. Therefore, the three colors are all high in spectral reflectance for the wavelength in proximity to 500 nm. For this reason, combinations of the C, M, and Y inks are apt to be higher in spectral reflectance for the wavelength in proximity to 500 nm than spectral reflectance for the other wavelengths. Meanwhile, the R ink and the V ink are very low in spectral reflectance for the wavelength of 500 nm or so. Therefore, when the C, M, or Y ink is combined with the R or V ink, the spectral reflectance for the wavelength in proximity to 500 nm does not outstand. As a result, print results wherein the colors do not change so much when the light source is varied are obtained.

The colored inks in this embodiment are inks prepared by mixing the C, M, Y, R, V, and K coloring materials into an aqueous solvent, respectively. However, inks using an oily solvent are also acceptable. The Cl ink is a clear ink prepared by mixing a substance which reacts with coloring materials and insolubilizes or agglutinates the coloring materials into the same aqueous solvent as that of the colored inks. Needless to add, an ink composed of a solvent different from that of the colored inks may be used. The Cl ink in this embodiment is colorless because chromatic coloring materials do not exist in a solvent. Use of the uncolored ink together with the colored inks makes it possible to add gloss to portions which have less colored inks and are less glossy. As a result, lack in the uniformity of gloss in print images can be reduced, and their glossy appearance can be improved. The Cl ink is recorded together with colored inks by the substance mixed into the solvent. Thereby, it can enhance the water resistance and the light resistance as compared with cases where only colored inks are recorded.

Use of the same solvent as the colored inks for the uncolored ink provides a property to give the same gloss as that of the colored inks. Consequently, lack in the uniformity of gloss in print images can be reduced with reliability by increasing the density of dots of uncolored ink with decrease in the density of dots of colored inks.

Use of the R or V ink enhances the image quality of print images in terms of metamerism. However, various printing devices can be adopted. For example, a printer may be adopted which does not use the R or V ink but uses colored inks in four colors and the Cl ink. Or, a printer may be adopted which uses a different combination of colored inks and the Cl ink. Further, the following printing devices can be adopted: a bubble-type printer so designed that it produces bubbles in ink passages and discharges inks; a laser printer so designed that it uses toner ink (colored ink) containing coloring material and toner ink (uncolored ink) containing no coloring material and prints print images on printing media; and the like.

In this printer 20, CPU 21, ROM 22, RAM 23, a communication I/O 24, a control IC 25, ASIC 26, I/F 27, and the like are connected together through a bus 20a. The CPU 21 controls each part in accordance with programs written in the ROM 22.

The communication I/O 24 is connected with the printer I/F 17e of the PC 10, and the printer 20 receives color-by-color raster data transmitted from the PC 10 through the communication I/O 24. The ASIC 26 communicates predetermined signals with the CPU 21, and outputs to a head drive unit 26a applied voltage data corresponding to the raster data. The head drive unit 26a generates applied voltage patterns for piezo elements, built in the print head, from the applied voltage data. Thereby, the head drive unit 26a causes the print head to discharge inks in seven colors, including Cl, on a dot-by-dot basis. The carriage mechanism 27a and the paper feed mechanism 27b connected with the I/F 27 cause the print head to make main passes. Further, the carriage mechanism 27a and the paper feed mechanism 27b perform form feed operation and feed printing paper in sequence to make auxiliary passes.

This printer can change the size of ink droplets by varying the pattern of voltage application to the piezo elements, and can thereby form dots in three different sizes, large, medium, and small. When the printer is fed with raster data comprising dot data in which the type of dot is represented on a raster-by-raster basis, it forms three different types of dots, different in ink quantity, on printing paper in correspondence with the raster data.

The raster data is data which represents the state of formation of dots with respect to each color on a raster-by-raster basis. The information of colors constituting dots is added to the raster data as additional information (e.g. header information). When the printer 20 is fed with the raster data, it forms dots corresponding to the raster data on printing paper on a raster-by-raster basis, using inks corresponding to the colors contained in the additional information. Thereby, the printer 20 prints print images. For example, if only the C, M, Y, R, V, and K colors are contained in the additional information, the printer 20 records images on printing media, using only the C, M, Y, R, V, and K inks without use of the Cl ink.

(2) Configuration of Printing Control Device

In the PC 10, a printer driver and the like for controlling the printer I/F 17e is installed into the OS, and they form part of the OS and carry out varied control. The APLs communicate data and the like with the hardware through the OS. The printer driver is operated when the printing function of APLs is carried out, and capable of two-way communication with the printer 20 through the printer I/F 19. The printer driver receives image data from APLs through the OS in which GDI and the like are installed, and converts it into raster data to be outputted to the printer 20. Then, the printer driver sends out the raster data to the printer 20.

Figure 3:
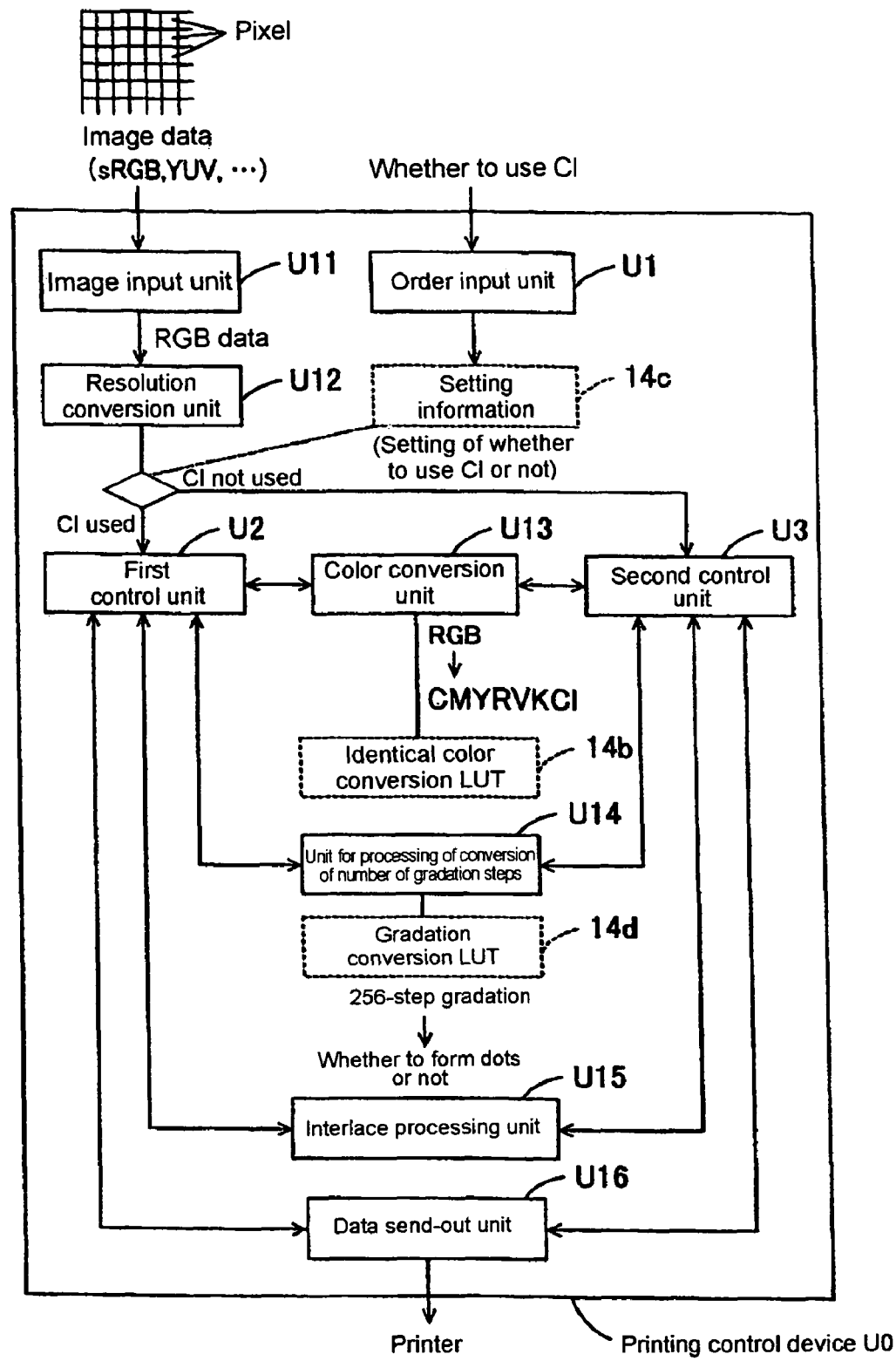
FIG. 3 is a block diagram schematically illustrating the configuration of a printing control device.
Figure 4:
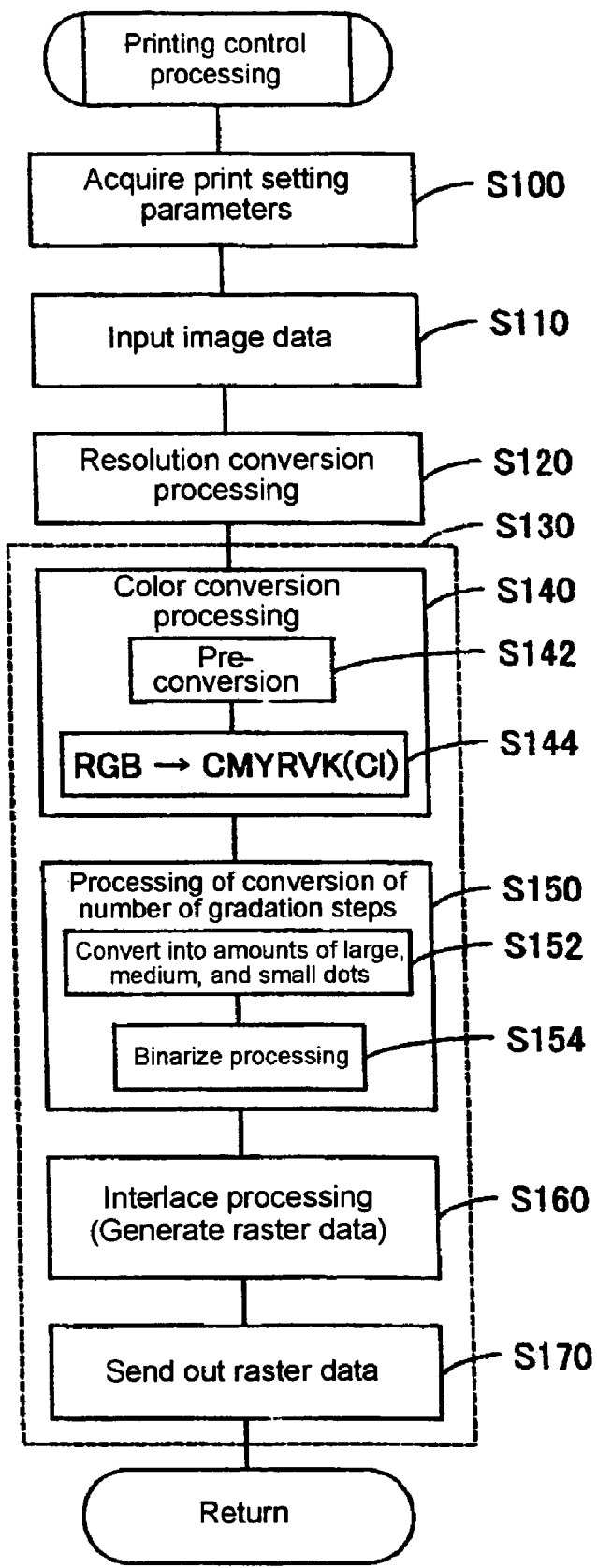
FIG. 4 is a flowchart illustrating printing control processing.
Figure 5:
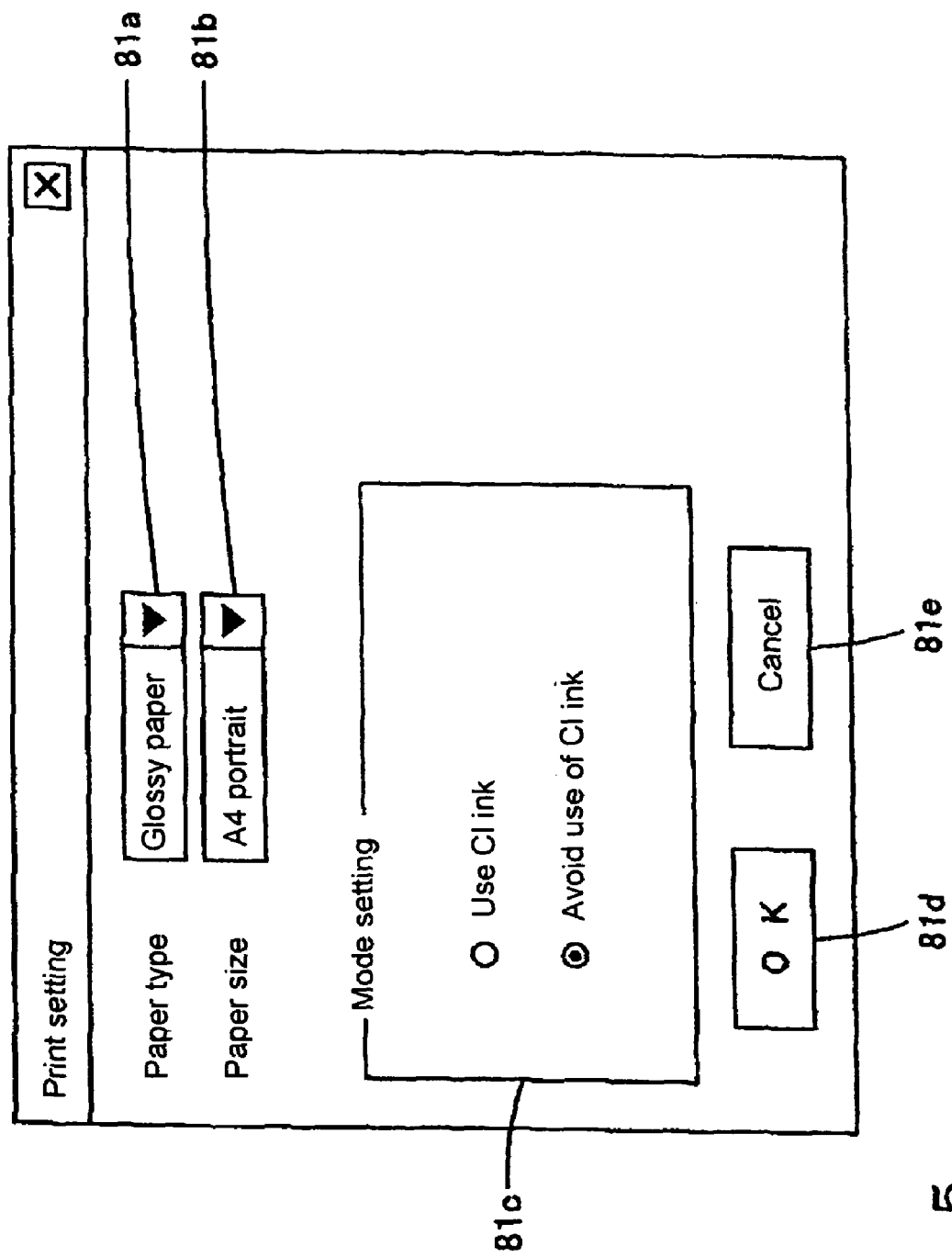
FIG. 5 is a drawing illustrating an example of the display on a print setting screen.

FIG. 3 is a drawing schematically illustrating the configuration of a printing control device U0 which the above hardware and the above control program construct in conjunction with each other. FIG. 4 is a flowchart illustrating the processing of the above printing control, and FIG. 5 is a drawing illustrating an example of the display on the print setting screen. This device U0 comprises various units U1 to U3 and U11 to U16, and carries out printing control corresponding to the setting information 14c stored on the HD 14. The setting information 14c is information indicating the setting of whether the Cl ink can be used or not. The setting information 14c can be constituted as flag-type information or the like. For example, predetermined code "1" is assigned to the information of setting in which the Clink is used, and predetermined code "0" is assigned to the information of setting in which the Cl ink is not used.

When a printing menu shown on the display 18a is carried out by the printing function for APL provided in APL, the flow of printing operation is started. An order input unit U1 displays the print setting screen illustrated in FIG. 5, and the processing of acquiring various print parameters is carried out. (Step S100. Hereafter, the denotation of "Step" will be omitted.) The screen indicates the following: a printing medium select field 81a through which a type of printing medium can be selected and inputted; a select field 81b through which the size of printing paper can be selected and inputted; a mode setting select field 81c which accepts the input of orders specifying whether to cause the printer to use the Cl ink or not; and buttons 83d and 83e. When inputs to the select fields 81a to 81c by the operation of the mouse or the keyboard are accepted and the OK button 83d is clicked, various print parameters are acquired. With respect to items of printing conditions for which the user does not make any setting, the previous information is acquired as default information. When "Use Cl ink" is selected in the mode setting select field 81c, the information of "setting for using the Cl ink" is taken as the setting information 14c. When "Avoid use of Cl ink" is selected, the information of "setting for avoiding the used of the Cl ink" is taken as the setting information 14c. That is, the PC that performs the processing of S100 constitutes an order control unit which takes information corresponding to order input as the setting information.

Even if a printing device which can use the Cl ink is prevented from using the Cl ink, the glossy appearance of print images is only influenced, and there is little influence on the colors of print images. Therefore, even if the use of the Cl ink is made selectable, no problem arises. In this printing control device, the user can input orders specifying whether to use uncolored ink according to the preferences of the user; therefore, this printing control device is convenient.

Next, image data comprising gradation data which is generated with respect to each of a large number (predetermined number) of pixels and corresponds to a plurality of component colors is inputted through an image input unit U11. Then, the image data is converted into RGB data with a 256-step gradation in the broad RGB color space. (Step S110. Hereafter, the denotation of "Step" will be omitted.) The inputted image data includes data from a digital camera 30, data recorded on CD-ROM 15a, and the like. The image data is data wherein images are rendered with gradation by a large number of pixels in a dot matrix pattern. The image data includes image data composed of R, G, and B defined in the sRGB color space, image data composed of Y, U, and V in the YUV color system, and the like. Needless to add, the image data may be data in accordance with the Exif2.2 standard (Exif is a trademark of the Japan Electronics and Information Technology Industries Association.), data in compliance with Print Image Matching (PIM: PIM is a trademark of Seiko Epson Corporation.), or the like. The components of image data are rendered with various numbers of gradation steps; therefore, image data is converted into RGB data in the broad RGB color space in which each of R, G, and B is rendered with a 256-step gradation (integral value of 0 to 255) in accordance with the definition of SRGB, YUV color system, or the like. Data may be partly read or only pointers indicating the buffer areas where the data is stored may be passed.

Further, a resolution conversion unit U12 performs resolution conversion processing in which the resolution is converted in accordance with the resolution with which the print image is printed (S120). In the conversion in this embodiment, the lateral resolution is multiplied by Nx (Nx is an integer not less than 1), and the longitudinal resolution is multiplied by Ny (Ny is an integer not less than 1). Needless to add, the following procedure may be taken on a case-by-case basis: to increase the resolution, new data is generated between the gradation data of a pixel and that of an adjacent pixel by linear interpolation; to reduce the resolution, data is thinned out at a constant rate; and to leave the resolution unchanged, the above RGB data is directly taken as image data obtained as the result of resolution conversion.

Though the details will be described later, the condition-by-condition printing control processing of S130 is performed according to the contents of the setting information 14c, that is, according to whether the Cl ink is used or not. When the setting information is the information of setting for using the Cl ink (hereafter, also referred to as "Cl use setting"), the following operation takes place: using various units U13 to U16, a first control unit U2 color-converts RGB data into image data comprising gradation data corresponding to the amounts of seven inks, C, M, Y, R, V, K, and Cl, consumed. Using the image data obtained as the result of color conversion, the first control unit U2 carries out such control as to cause the printer 20 to print a print image using the colored inks and the uncolored ink. When the setting information is the information of setting for avoiding the use of the Cl ink (hereafter, also referred to as "Cl nonuse setting"), the following operation takes place: using various units U13 to U16, a second control unit U3 color-converts RGB data into image data comprising gradation data corresponding to the amounts of at least six inks, C, M, Y, R, V, and K, consumed. Using the image data obtained as the result of color conversion, the second control unit U3 carries out such control as to cause the printer 20 to print a print image using only the colored inks. That is, the first printing control unit comprises the first control unit U2 and the various units U13 to U16, and the second printing control unit comprises the second control unit U3 and the various units U13 to U16.

After resolution conversion, a color conversion unit U13 refers to the color conversion LUT 14b and thereby performs the following processing: it color-converts RGB data comprising gradation data corresponding to a plurality of component colors R, G, and B into image data comprising gradation data corresponding to the amounts of the C, M, Y, R, V, K, and Cl inks or only the colored inks consumed (S140). More specific description will be given. The color conversion unit U13 performs pre-conversion processing in which the gradation data of each pixel constituting the RGB data obtained as the result of resolution conversion is converted into the gradation data of lattice points in the LUT 14b (S142). The color conversion unit U13 moves the target pixel one by one, taking as an object to be converted the gradation data of each pixel constituting the RGB data obtained as the result of pre-conversion. While doting this, the color conversion unit U13 refers to the LUT 14b and thereby color-converts the RGB data into image data comprising gradation data corresponding to the amounts of the C, M, Y, R, V, K, and Cl inks or only the colored inks consumed (S144).

Pre-conversion processing is processing in which the coordinate values (gradation values) in the RGB color space of RGB data are converted using the predetermined processing of conversion of number of gradation steps. They are converted into any of coordinate values (gradation values) corresponding to the lattice points in the color conversion LUT. For example, the technique disclosed in Japanese Unexamined Patent Publication No. Hei 7 (1995)-30772 can be used. Each piece of gradation data is converted into the gradation data of nearby lattice points using the error diffusion method or the average error minimum method. This conversion is carried out so that the average value of the gradation data of each pixel in local areas in an image rendered by the RGB data obtained as the result of pre-conversion will be equal to the average value of the gradation data of each pixel in the local areas in the image rendered by the RGB data prior to the pre-conversion as much as possible. Thus, color correction results substantially equal to those obtained when interpolation is carried out without pre-conversion can be obtained. As a result, the color conversion processing can be speeded without increasing the storage capacity for color conversion LUTs.

Figure 6:
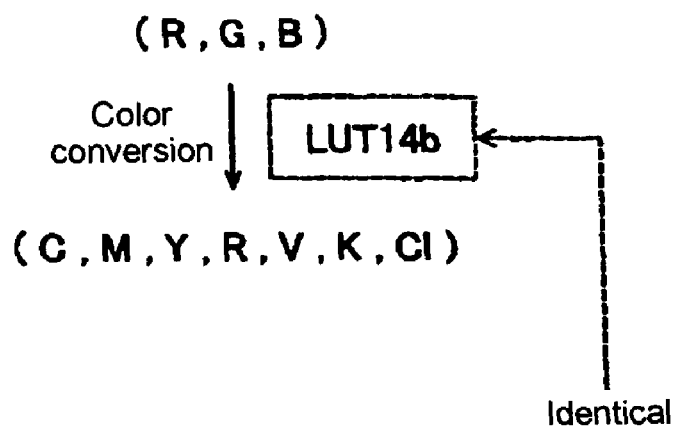
FIG. 6 is a drawing schematically illustrating the structure of a color conversion LUT.
Figure 6:
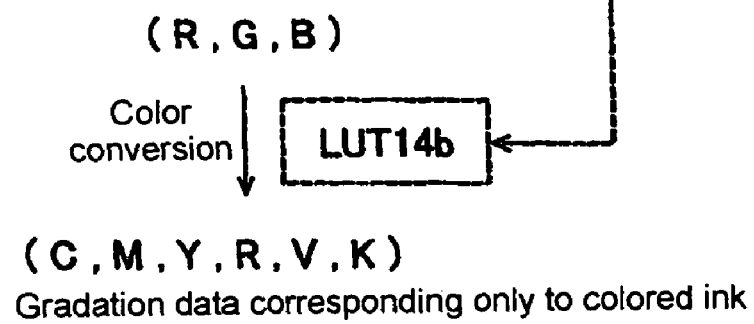

FIG. 6 schematically illustrates the structure of a color conversion LUT 14b stored on the HD 14. The LUT 14b is an information table in which the correspondence between gradation data corresponding to three component colors, R, G, and B, before conversion and gradation data corresponding to seven component colors, C, M, Y, R, V, K, and Cl, after conversion is defined with respect to a plurality of lattice points (reference points). The LUT holds gradation data with respect to each of C, M, Y, R, V, K, and Cl, and gradation data with respect to each of C, M, Y, R, V, K, and Cl matched with inputted RGB data can be obtained from the LUT. The LUT 14b is a common LUT used regardless of whether to use the Cl ink or not. It holds gradation data D11 for the colored corresponding to the amounts of colored ink consumed and gradation data D12 for the uncolored corresponding the amount of uncolored ink consumed.

When the resolution is multiplied by Nx×Ny in the above resolution conversion processing, pre-conversion processing is carried out by Nx×Ny pixels after resolution conversion corresponding to pixels before resolution conversion. After the same processing is performed with respect to the amount equivalent to Ny rasters, the processing by Nx×Ny pixels is repeated with respect to the next Ny rasters.

As an example, it is assumed that the resolution before conversion is 360 horizontal×360 vertical dpi and the resolution after conversion (same as the resolution of print image) is 1440×720 dpi. In this case, pre-conversion is carried out by 4×2 pixels. If the position of RGB data before pre-conversion in the RGB color space is not equal to the position of a lattice point, the gradation data of a plurality of lattice points existing in proximity to the RGB data is used. At this time, the gradation data of each lattice point must be allocated to the individual pixels within 4×2 pixels. Consequently, the gradation data of each lattice point is allocated at such a rate as in proportion to the reciprocal of the distance between the position of the RGB data and the position of each lattice point. Thereby, the gradation data of each pixel within 4×2 pixels is obtained.

Needless to add, at S140, color conversion may be carried out without pre-conversion. In this case, if C, M, Y, R, V, K, or Cl matched with the inputted RGB data is not held in the LUT, then the following procedure can be taken: gradation data corresponding to a plurality of pieces of RGB data close to the RGB data is acquired. Then, gradation values after color conversion are computed by interpolation, such as volumetric interpolation.

In this embodiment, under the Cl use setting, RGB data is color-converted into image data comprising gradation data with respect to each of C, Y, R, V, K, and Cl (gradation data corresponding to the amounts of the colored inks and the uncolored ink consumed). Under the Cl nonuse setting, RGB data is color-converted into image data comprising gradation data with respect to each of C, M, Y, R, V, and K (gradation data corresponding to the amounts of only the colored inks consumed).

The RGB data immediately before color conversion, to be color-converted is the input image data referred to in the present invention. However, other types of image data may also be considered as input image data referred to in the present invention. Such image data includes: image data immediately before pre-conversion, to be subjected to pre-conversion; image data immediately before resolution conversion, to be subjected to resolution conversion; and the image data inputted at S110. The image data obtained as the result of color conversion is image data comprising gradation values with respect to each of a plurality of other component colors C, M, Y, R, V, K, and Cl or C, M, Y, R, V, and K which represents the print images (output images) of the printer 20. The image data obtained as the result of color conversion is data with a 256-step gradation with respect to each of the component colors wherein images are represented with gradation by a large number (predetermined number) of pixels in a dot matrix pattern.

After color conversion, a unit U14 for processing of conversion of number of gradation steps performs a predetermined processing of conversion of number of gradation steps (half tone processing). This processing is performed on the image data obtained as the result of color conversion, comprising gradation data corresponding to the amounts of the C, M, Y, R, V, K, and Cl inks or only the colored inks consumed. Thereby, the unit U14 generates half tone data (data representing the state of formation of dots) of the C, M, Y, R, V, K, and Cl inks or only the colored inks (S150). The processing of S150 is the processing of conversion of number of gradation steps in the broad sense of the term. More specifically, the processing described below is performed.

Figure 7:
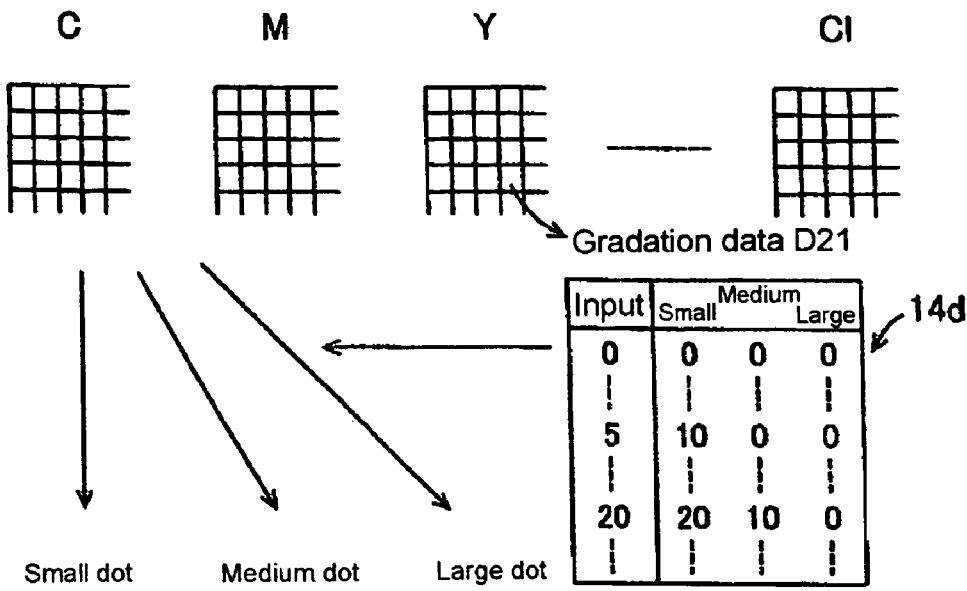
FIG. 7 is a drawing schematically illustrating an concrete example of the processing of conversion of number of gradation steps.
Figure 7:
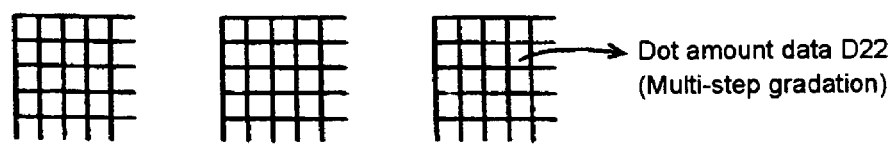
Figure 7:
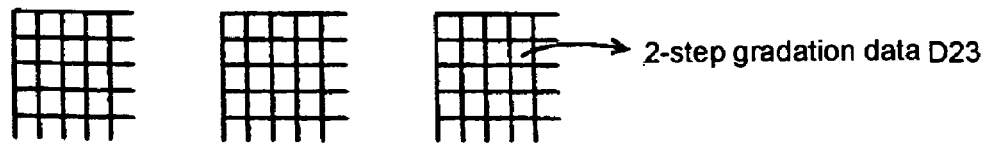

FIG. 7 illustrates a concrete example of the processing of conversion of number of gradation steps. In this embodiment, first, the target pixel is moved one by one with respect to each of the component colors after color conversion with the gradation data D21 of each pixel constituting the image data obtained as the result of color conversion taken as objects to be converted. While this is done, the gradation conversion table (gradation conversion LUT) 14d stored on the HD 14 is referred to. Thereby, the gradation data of the target pixel is converted into dot amount data D22 which represents the dot amount corresponding to the quantity of ink consumed by dot types, large, medium, and small (S152). The dot amount data D22 is multi-step gradation data with respect to each ink type with respect to each of a large number of pixels in a dot matrix pattern constituting the image data obtained as the result of color conversion. Next, the target pixel is moved one by one with the dot amount data D22 of each pixel taken as objects to be converted by ink type. While this is done, the dot amount data of all the pixels is binarized by binarization using such a technique as error diffusion method and dither method. (This binarization is the processing of conversion of number of gradation steps in the narrow sense of the term.) Thereby, half tone data comprising 2-step gradation data D23 with respect to each of the dot types, large, medium, and small (S154). This half tone data is data representing whether to form a dot or not. It can be constituted as, for example, data in which gradation value "1" is related to "dot formed" and gradation value "0" is related to "dot not formed."

The gradation conversion LUT 14d is an information table in which the following is defined by ink type with respect to each gradation value of gradation data: the correspondence between gradation dada with a 256-step gradation before conversion and dot amount data which represents the dot amount after conversion. The LUT is constituted with respect to each of C, M, Y, R, V, K, and Cl, and the LUT for each color holds dot amount data which represents the dot amount with respect to each of large dot, medium dot, and small dot. Dot amount data by dot type, large, medium, or small, matched with inputted gradation data can be acquired from the LUT.

Needless to add, at S150, the following processing may be performed: the information table in which the correspondence between gradation data with a 256-step gradation before conversion and half tone data (data representing the state of formation of dots) with a 4-step gradation after conversion is defined with respect to each ink type is referred to. Thereby, the image data obtained as the result of color conversion is converted into half tone data with a 4-step gradation. This half tone data can be constituted as, for example, data in which the following relation is provided: gradation value "3" is related to "large dot formed"; gradation value "2" is related to "medium dot formed"; gradation value "1" is related to "small dot formed"; and gradation value "0" is related to "dot not formed."

In this embodiment, under the Cl use setting, image data comprising gradation data with respect to each of C, M, Y, R, V, K, and Cl is converted into half tone data comprising 2-step gradation data with respect to each of C, M, Y, R, V, K, and Cl and with respect to each dot type. Under the Cl non use setting, image data comprising gradation data with respect to each of C, M, Y, R, V, and K is converted into half tone data comprising 2-step gradation data with respect to each of C, M, Y, R, V, and K and with respect to each dot type.

After the conversion of number of gradation steps, an interlace processing unit U15 performs predetermined interlace processing (rasterize processing) on the half tone data. Thereby, the unit U15 rearranges the data in the order of use in the printer, and generates raster data in which the state of formation of dots of the C, M, Y, R, V, K, and Cl inks or only the colored inks is represented (S160). At this time, information indicating colors in which dots are formed is added. In the interlace processing, microweave processing may be performed.

Then, a data send-out unit U16 performs raster data send-out processing to output the raster data to the printer 20 (S170), and the flow of operation is terminated. Then, the printer 20 acquires the raster data representing the print image, and drives the print head according to the data. Thereby, the printer 20 discharges inks on printing paper, and prints a print image corresponding to the image data.

The processing of S150 to S170 corresponds to such control as to cause the printing device to use inks and print a print image, using the image data obtained as the result of color conversion. If the printing device is capable of performing half tone processing and rasterize processing, such control as to cause the printing device to print the print image can be carried out by the following: directly outputting the image data obtained as the result of color conversion to the printing device.

(3) Details of Processing Performed by Printing Control Device

Figure 8:
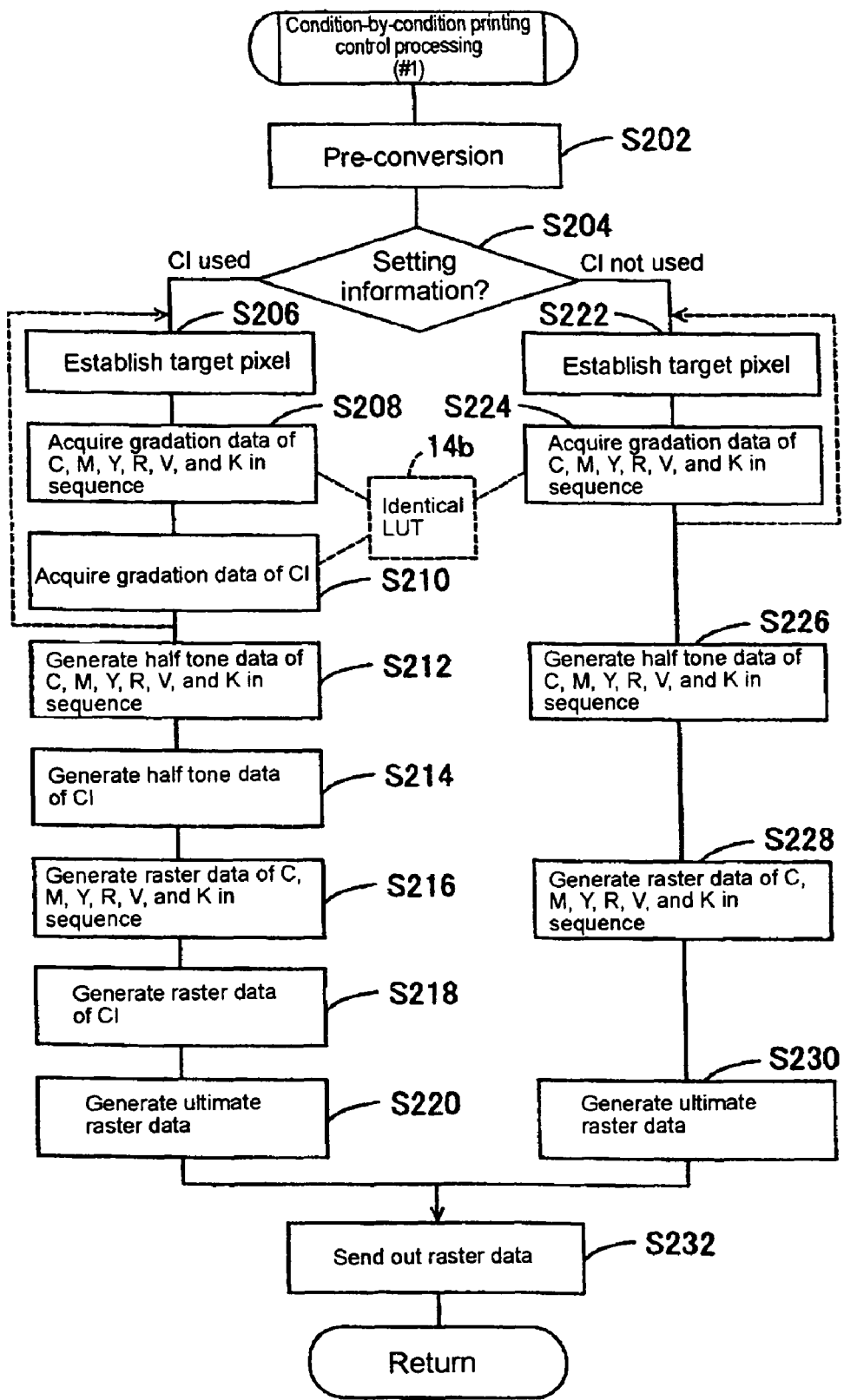
FIG. 8 is a flowchart illustrating the details of condition-by-condition printing control processing (#1).

FIG. 8 is a flowchart illustrating the details of the condition-by-condition printing control processing of S130. First, the above pre-conversion is carried out on the RGB data obtained as the result of resolution conversion (S202), and the processing is branched according to the setting information 14c (S204). If the setting information 14c is the information of setting for using the Cl ink (for example, code "1"), the processing of S206 to S220 and S232 is performed. If the setting information 14c is the information of setting for avoiding the use of the Cl ink (for example, code "0"), the processing of S222 to S230 and S232 is performed. That is, the PC which performs the processing of S204, S206 to S220, and S232 constitutes the first printing control unit. The PC which performs the processing of S204, S222 to S230, and S232 constitutes the second printing control unit.

Under the Cl use setting, at S206 to S210, the processing illustrated in the middle part of FIG. 6 is performed. That is, the color conversion LUT 14b is referred to, and thereby the RGB data as input image data is color-converted into gradation data corresponding to the amounts of the C, M, Y, R, V, K, and Cl inks consumed. At S206, the target pixel to be subjected to color conversion is established from among all the pixels of the RGB data that has not been subjected to color conversion. Next, the target component color for which gradation data after color conversion is to be acquired is established from among the C, M, Y, R, V, K, and Cl component colors. Based on the gradation data of the target pixel, the LUT 14b is referred to, and thereby the gradation data after color conversion is acquired in sequence for the target component color. For convenience of explanation, the flowchart is described so that the following operation takes place: at S208, the gradation data for the colored in the LUT 14d is referred to, and thereby the gradation data for the colored of C, M, Y, R, V, and K is acquired in sequence; and at S210, the gradation data for the colorless in the LUT 14d is referred to, and thereby the gradation data for the colorless of Cl is acquired. When pixels which have not been subjected to conversion remain, the processing of S206 to S210 is repeated. With respect to all the pixels, the LUT 14b is referred to, and thereby gradation data obtained as the result of color conversion corresponding to input image data is acquired. Thus, all the input image data can be color-converted into image data comprising gradation data corresponding to the amounts of the colored inks and the uncolored ink consumed.

After color conversion, the target component color for which half tone data after conversion of number of gradation steps is to be generated is established in sequence from among the C, M, Y, R, V, K, and Cl component colors. With respect to the target component color, the above processing of conversion of number of gradation steps is performed on the image data obtained as the result of color conversion. Thereby, half tone data which represents the state of formation of dots of the C, M, Y, R, V, K, and Cl inks is generated. This processing is performed with respect to all the component colors. For convenience of explanation, the flowchart is described so that the following operation takes place: at S212, half tone data which represents whether to form a large, medium, or small dot of C, M, Y, R, V, or K is generated in sequence; and at S214, half tone data which represents whether to form a large, medium, or small dot of Cl is generated.

After the conversion of number of gradation steps, the target component color for which raster data after interlace processing is to be generated is established in sequence from among the C, M, Y, R, V, K, and Cl component colors. With respect to the target component color, the above interlace processing is performed on half tone data to rearrange the data. Thereby, interim raster data (intermediate raster data) in which the state of formation of dots of the C, M, Y, R, V, K, and Cl inks is represented is generated. This processing is performed with respect to all the component colors. For convenience of explanation, the flowchart is described so that the following operation takes place: at S216, intermediate raster data in which whether to form a large, medium, or small dot of C, M, Y, R, V, or K is represented is generated in sequence; and at S218, intermediate raster data in which whether to form a large, medium, or small dot of Cl is represented is generated. Then, information which represents that the dots of C, M, Y, R, V, K, and Cl are formed and the like are added as additional information or the like procedure is taken, and thereby, the ultimate raster data is generated (S220).

Thereafter, the operation proceeds to S232, and the above raster data send-out processing is performed to output the raster data to the printer. Then, the flow of operation is terminated.

When the printer is fed with the raster data, it forms dots corresponding to the raster data on printing paper on a raster-by-raster basis. At this time, the printer forms the dots according to the information representing that dots of C, M, Y, R, V, K, and Cl are formed, contained in the additional information, using all the inks in seven colors. Thus, the printer prints the print image.

Under the Cl nonuse setting, at S222 and S224, the processing illustrated in the lower part of FIG. 6 is performed. That is, the color conversion LUT 14b is referred to, and thereby the RGB data is color-converted into gradation data corresponding to the amounts of only the C, M, Y, R, V, and K inks, excluding the Cl ink. The color conversion LUT used here is the same LUT as the LUT 14b used at S208 and S210. At S222, as at S206, the target pixel to be subjected to color conversion is established from among all the pixels of the RGB data. Next, the target component color for which gradation data after color conversion is to be acquired is established from among the C, M, Y, R, V, and K component colors. Based on the gradation data of the target pixel, the LUT 14b is referred to, and thereby the gradation data for the colored after color conversion is acquired in sequence for the target component color (S224). When pixels which have not been subjected to conversion remain, the processing of S222 and S224 is repeated. With respect to all the pixels, the gradation data obtained as the result of color conversion is acquired. Thus, all the input image data can be color-converted into image data comprising gradation data corresponding to the amounts of only the colored inks consumed.

Even if the Cl ink is not used, the colors of print images are hardly influenced. Therefore, after the completion of color conversion, the processing of correcting gradation data of C, M, Y, R, V, and K is unnecessary. Such processing includes the processing of allocating the gradation data corresponding to the amount of the Cl ink consumed to the gradation data corresponding to the C, M, Y, R, V, and K inks before the next processing of conversion of number of gradation steps is performed. Therefore, the printing control processing is not complicated.

After color conversion, as at S212, the target component color for which half tone data is to be generated is established in sequence from among the C, M, Y, R, V, and K component colors. While this is done, the above processing of conversion of number of gradation steps is performed on the image data obtained as the result of color conversion. Thereby, half tone data which represents the state of formation of large, medium, and small dots of only the C, M, Y, R, V, and K inks is generated (S226).

After the conversion of number of gradation steps, as at S216, the target component color for which raster data is to be generated is established in sequence from among the C, M, Y, R, V, and K component colors. While this is done, the above interlace processing is performed on half tone data, and thereby, intermediate raster data in which the state of formation of dots of only the C, M, Y, R, V, and K inks is represented is generated (S228). Then, information which represents that the dots of C, M, Y, R, V, and K are formed and the like are added as additional information or the like procedure is taken, and thereby, the ultimate raster data is generated (S230).

Thereafter, the operation proceeds to S232, and the above raster data send-out processing is performed to output the raster data to the printer. Then, the flow of operation is terminated.

When the printer is fed with the raster data, it forms dots corresponding to the raster data on printing paper on a raster-by-raster basis. At this time, the printer forms dots according to the information representing that dots of C, M, Y, R, V, and K are formed, contained in the additional information, using only the colored inks. Thus, the printer prints the print image.

As mentioned above, even if a printing device which can use the Cl ink is prevented from using uncolored ink, the colors of print images are hardly influenced as compared with cases where the Cl ink is used. Therefore, the identical color conversion table can be referred to regardless of the setting of whether to use the Cl ink or not. Thus, the data size of color conversion tables can be reduced, and the storage capacity of an information storage medium, such as HD, for color conversion tables can be reduced as well.

Under the Cl nonuse setting, the processing of S210, S214, or S218 is not preformed unlike the Cl use setting. Thus, the processing for the Cl ink becomes unnecessary in color conversion processing, the processing of conversion of number of gradation steps, and interlace processing. As a result, processing that is otherwise required for seven colors only has to be performed only for six colors. In addition, the processing of correcting gradation data of C, M, Y, R, V, and K, obtained as the result of color conversion is also unnecessary. Therefore, the printing control processing can be speeded as compared with cases where color conversion processing, the processing of conversion of number of gradation steps, and interlace processing, which are performed when the Cl ink is used, are directly used.

Conventionally, only colored ink is used without use of uncolored ink. In this case, if one or more inks of a plurality of different colored inks are not used, the colors of print images are greatly influenced. (The appearance of colors changes beyond certain limits.) Therefore, to print an image without using some colored inks, a dedicated color conversion table must be prepared. According to the present invention, the ink the use or nonuse of which is selected is the Cl ink, and the appearance of colors does not change beyond certain limits. Therefore, a useful effect is obtained: the storage capacity for color conversion tables can be reduced by using the identical color conversion table.

The computer and the printing device which can be used to implement the present invention can be constituted in various manners. For example, the printer may be integrated with a computer, or may be a dedicated device so designed as to print only monochromic images.

Or, a printing device which can use two different black inks, deep K and pale Lk, may be used. In this case, for example, the following control is carried out: RGB data is color-converted into image data comprising gradation data with respect to each of C, M, Y, R, V, K', and Cl. (K' is gradation data corresponding to the amount of ink consumed. This amount is obtained by converting the amount of the Lk ink consumed into the amount of the K ink consumed, and adding the amount of the K ink consumed to the result of conversion.) The gradation data of K' is subjected to predetermined color separation to generate gradation data of K and gradation data of Lk. Using the image data comprising gradation data which represents the amounts of the C, M, Y, R, V, K, Lk, and Cl inks, control is carried out so as to cause the printing device to print a print image using eight different inks. In this case, the component colors corresponding to gradation data before color conversion are R, G, and B, and other component colors corresponding to gradation data immediately after color conversion are seven colors, C, M, Y, R, V, K' and Cl. However, the gradation data with respect to each of C, M, Y, R, V, K' and Cl can be taken as gradation data corresponding to the amounts of colored ink and uncolored ink consumed, referred to in the present invention. This is because the gradation data of K' is data which represents the amounts of both the K ink and the Lk ink consumed. The above color separation can be take as part of the half tone processing referred to in the present invention. Needless to add, image data comprising gradation data representing the amounts of the C, M, Y, R, V, K, Lk, and Cl inks after color separation may be taken as the gradation data corresponding to the amounts of colored ink and uncolored ink consumed, referred to in the present invention.

(4) Second Embodiment

Figure 9:
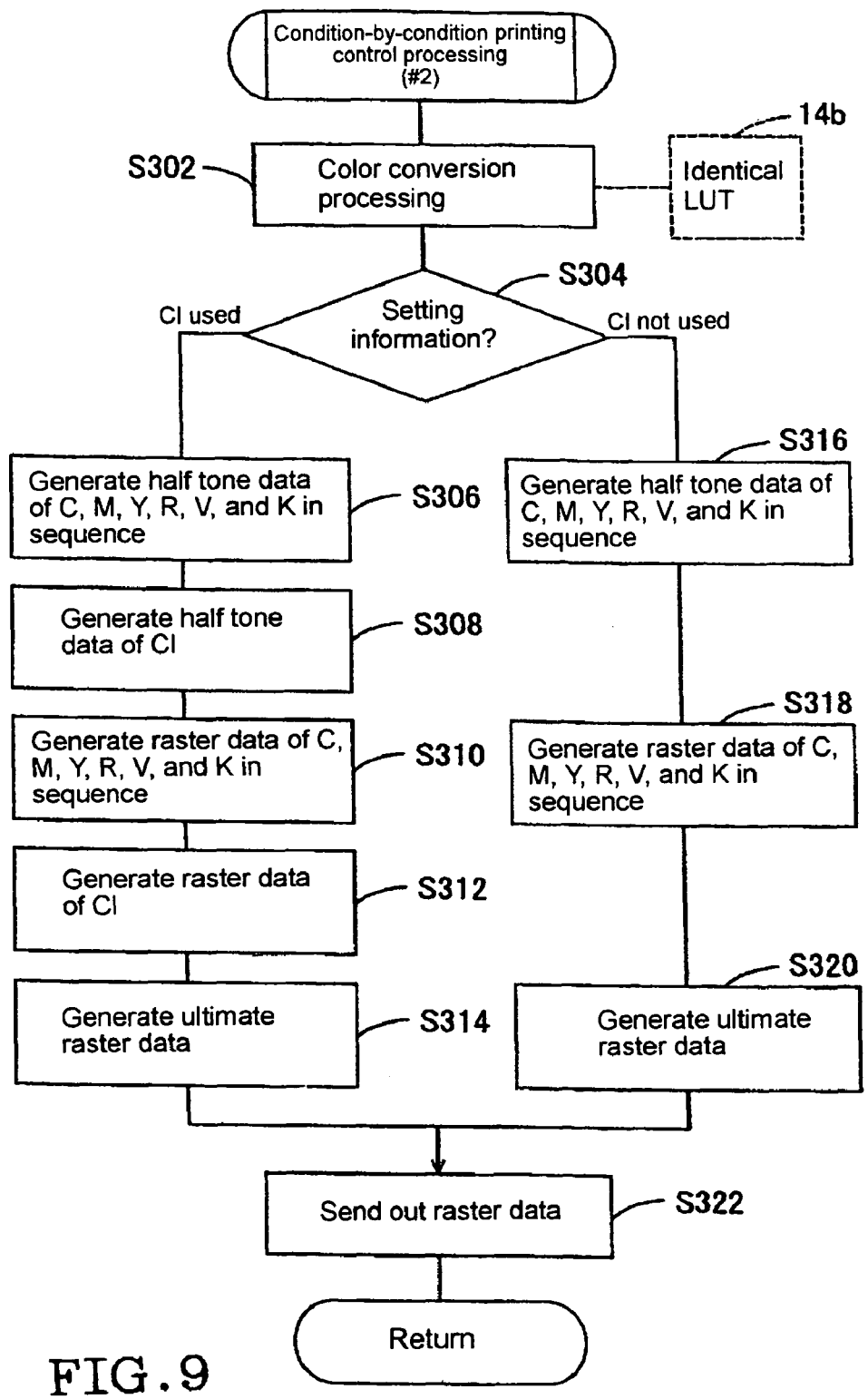
FIG. 9 is a flowchart illustrating the details of condition-by-condition printing control processing (#2) in a second embodiment.

FIG. 9 is a flowchart illustrating the details of the condition-by-condition printing control processing of S130 in the second embodiment. First, the identical color conversion LUT 14b is referred to regardless of whether to use the Cl ink. Thereby, the RGB data obtained as the result of resolution conversion is color-converted into gradation data corresponding to the amounts of all the inks in seven colors consumed (S302). Thereafter, the processing is branched according to the setting information 14c (S304). If the setting information 14c is the information of setting for using the Cl ink, the processing of S306 to S314 and S322 is performed by the first printing control unit. If the setting information 14c is the information of setting for avoiding the use of the Cl ink, the processing of S316 to S320 and S322 is performed by the second printing control unit.

Under the Cl use setting, the target component color is established in sequence from among all the seven component colors. While this is done, the processing of conversion of number of gradation steps is performed on the image data obtained as the result of color conversion. Thereby, half tone data is generated with respect to each component color. The flowchart is described so that the following operation takes place: at S306, half tone data which represents whether to form dots of the C, M, Y, R, V, and K inks is generated in sequence; and at S308, half tone data which represents whether to form a dot of the Cl ink is generated.

After the conversion of number of gradation steps, the target component color is established in sequence from among all the seven component colors. While this is done, interlace processing is performed on the half tone data to generate intermediate raster data with respect to each component color. The flowchart is described so that the following operation takes place: at S310, intermediate raster data in which whether to form dots of the C, M, Y, R, V, and K inks is represented is generated in sequence; and at S312, intermediate raster data in which whether to form a dot of the Cl ink is represented is generated. Then, information which represents that the dots of C, M, Y, R, V, K, and Cl are formed is added or the like procedure is taken, and thereby, the ultimate raster data is generated (S314). Raster data send-out processing is performed to output the raster data to the printer (S314), and the flow of operation is terminated. Then, the printer forms dots corresponding to the raster data, using all the inks in seven colors according to the additional information, and thereby prints the print image.

By the processing of S310 to S314 and S322, control can be carried out so as to cause the printer to form dots of colored ink and uncolored ink to print a print image, using half tone data.

Under the Cl nonuse setting, as at S306, the target component color is established in sequence from among the C, M, Y, R, V, and K component colors. While this is done, the processing of conversion of number of gradation steps is performed on the image data obtained as the result of color conversion. Thereby, half tone data corresponding only to the C, M, Y, R, V, and K inks is generated (S316). However, gradation data corresponding to the amount of the Cl ink consumed is not used, and as a result, half tone data corresponding to the Cl ink is not generated. Thus, half tone processing is performed only on the gradation data corresponding to the amounts of the colored inks consumed of the image data obtained as the result of color conversion. Thereby, data which represents the state of formation of dots of only the colored inks is generated.

After the conversion of number of gradation steps, as at S310, the target component color is established in sequence from among the C, M, Y, R, V, and K component colors. While this is done, interlace processing is performed on the half tone data to generate intermediate raster data in which the state of formation of dots of only the C, M, Y, R, V, and K inks is represented (S318). Then, information which represents that the dots of C, M, Y, R, V, and K are formed is added or the like procedure is taken, and thereby, the ultimate raster data is generated (S320). Raster data send-out processing is performed to output the raster data to the printer (S322), and the flow of operation is terminated. Then, the printer forms dots corresponding to the raster data, using only the colored inks according to the additional information, and thereby prints the print image.

By the processing of S316 to S322, control can be carried out so as to cause the printer to form dots of only colored ink to print a print image, using half tone data.

In the above processing as well, the identical color conversion table can be referred to regardless of whether to use the Cl ink, and thus the storage capacity for color conversion tables can be reduced.

Under the Cl nonuse setting, the processing of S308 or S312 is not performed unlike the Cl use setting. Thus, the processing for the Cl ink becomes unnecessary in the processing of conversion of number of gradation steps and interlace processing. In addition, the processing of correcting gradation data of C, M, Y, R, V, and K, obtained as the result of color conversion is also unnecessary. Therefore, the printing control processing can be speeded as compared with cases where the processing of conversion of number of gradation steps and interlace processing, which are performed when the Cl ink is used, are directly used.

(5) Third Embodiment

Figure 10:
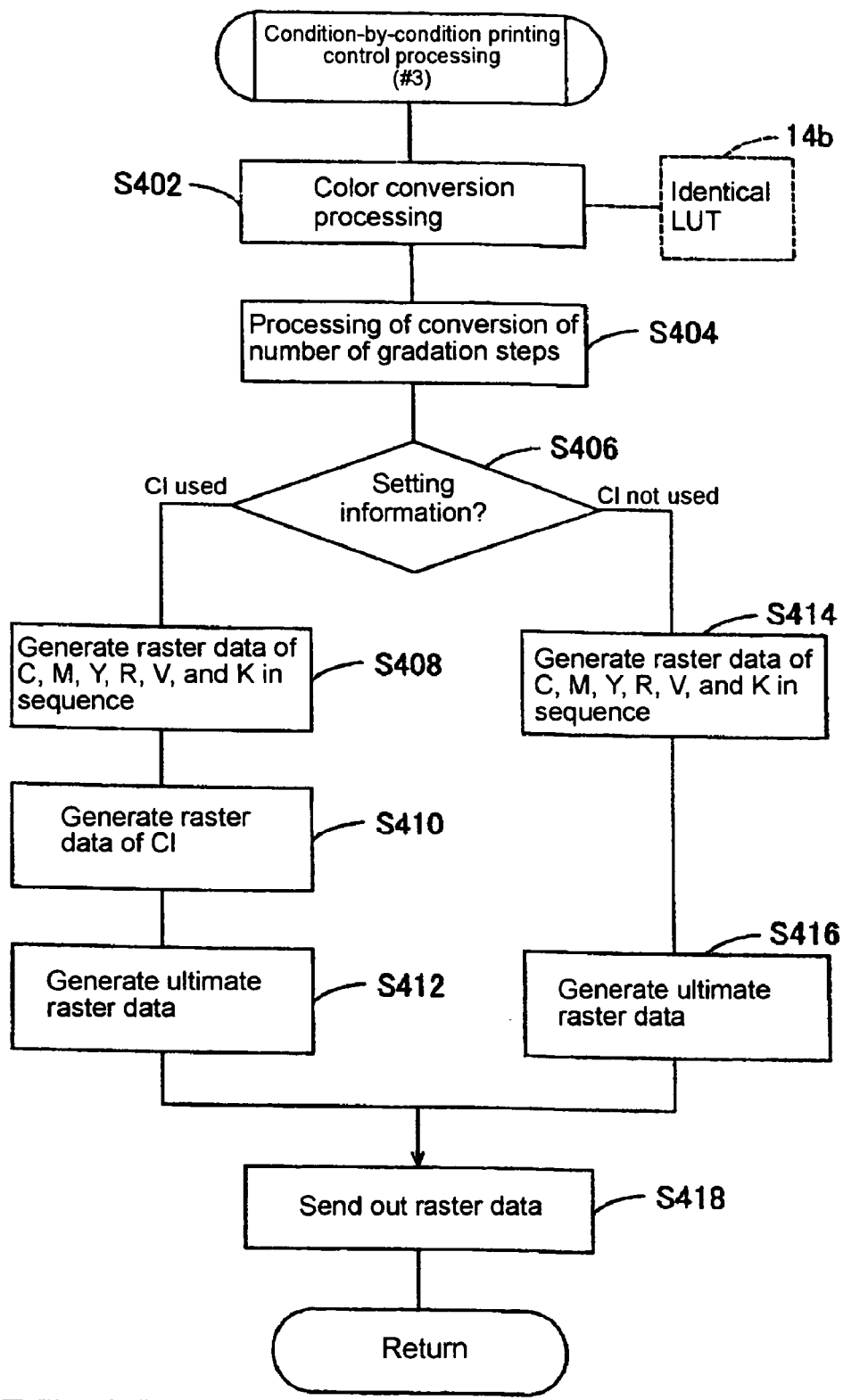
FIG. 10 is a flowchart illustrating the details of condition-by-condition printing control processing (#3) in a third embodiment.

FIG. 10 is a flowchart illustrating the details of the condition-by-condition printing control processing of S130 in the third embodiment. First, the identical color conversion LUT 14b is referred to regardless of whether to use the Cl ink. Thereby, the RGB data is color-converted into gradation data corresponding to the amounts of all the inks in seven colors consumed (S402). Then, the processing of conversion of number of gradation steps is performed on the image data obtained as the result of color conversion to generate half tone data which represents the state of formation of dots of the C, M, Y, R, V, K, and Cl inks (S404). Thereafter, the processing is branched according to the setting information 14c (S406). If the setting information 14c is the information of setting for using the Cl ink, the processing of S408 to S412 and S418 is performed by the first printing control unit. If the setting information 14c is the information of setting for avoiding the use of the Cl ink, the processing of S414, S416, and S418 is performed by the second printing control unit.

Under the Cl use setting, the target component color is established in sequence from among all the seven component colors. While this is done, interlace processing is performed on the half tone data to generate intermediate raster data with respect to each component color. The flowchart is described so that the following operation takes place: at S408, intermediate raster data in which whether to form dots of the C, M, Y, R, V, and K inks is represented is generated in sequence; and at S410, intermediate raster data in which whether to form a dot of the Cl ink is represented is generated. Then, information which represents that dots of C, M, Y, R, V, K, and Cl are formed is added or the like procedure is taken, and thereby, the ultimate raster data is generated (S412). Raster data send-out processing is performed to output the raster data to the printer (S414), and the flow of operation is terminated. Then, the printer forms dots corresponding to the raster data, using all the inks in seven colors according to the additional information, and thereby prints the print image.

By the processing of S408 to S412 and S418, control can be carried out so as to cause the printer to form dots of colored ink and uncolored ink to print a print image, using half tone data.

Under the Cl nonuse setting, as at S408, the target component color is established in sequence from among the C, M, Y, R, V, and K component colors. While this is done, interlace processing is performed on the half tone data to generate intermediate raster data in which the state of formation of dots of only the C, M, Y, R, V, and K inks is represented (S414). However, half tone data corresponding to the Cl ink is not used, and as a result, raster data corresponding to the Cl ink is not generated. In other words, half tone data for the Cl ink is not passed but only half tone data for the colored inks is passed from the processing of conversion of number of gradation steps to interlace processing.

Then, information which represents that the dots of C, M, Y, R, V, and K are formed is added or the like procedure is taken, and thereby, the ultimate raster data is generated (S416). Raster data send-out processing is performed to output the raster data to the printer (S418), and the flow of operation is terminated. Then, the printer forms dots corresponding to the raster data, using only the colored inks according to the additional information, and thereby prints the print image.

Thus, control can be carried out so as to cause the printer to form dots of only the colored inks to print a print image, using only data corresponding to the colored inks of half tone data.

In the above processing as well, the identical color conversion table can be referred to regardless of whether to use the Cl ink, and thus the storage capacity for color conversion tables can be reduced.

Under the Cl nonuse setting, the processing of S410 is not performed unlike the Cl use setting. Thus, the processing for the Cl ink becomes unnecessary in interlace processing. In addition, the processing of correcting gradation data of C, M, Y, R, V, and K, obtained as the result of color conversion is also unnecessary. Therefore, the printing control processing can be speeded as compared with cases where interlace processing, which is performed when the Cl ink is used, is directly used.

(6) Fourth Embodiment

Figure 11:
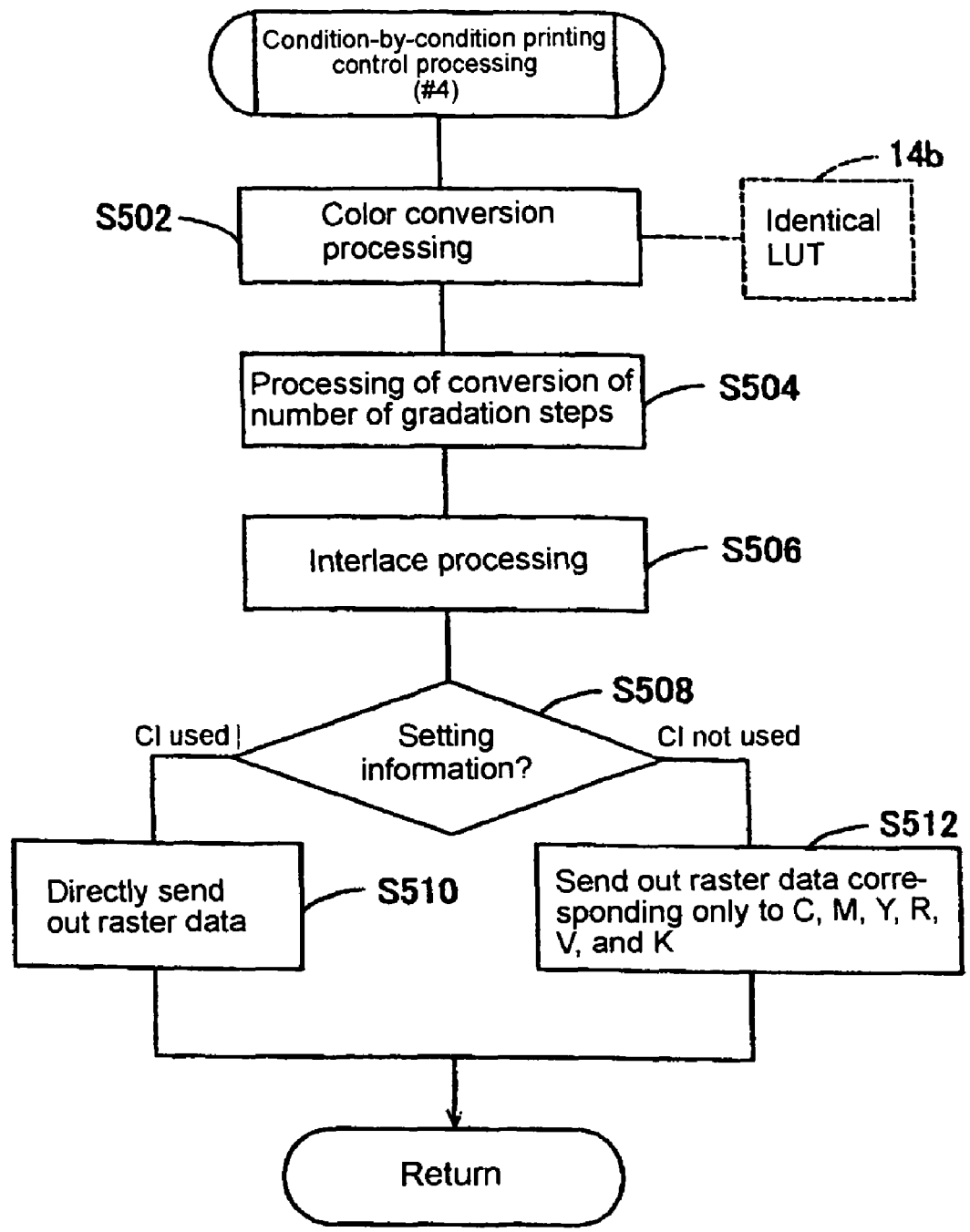
FIG. 11 is a flowchart illustrating the details of condition-by-condition printing control processing (#4) in a fourth embodiment.

FIG. 11 is a flowchart illustrating the details of the condition-by-condition printing control processing of S130 in the fourth embodiment. First, the identical color conversion LUT 14b is referred to regardless of whether to use the Cl ink. Thereby, the RGB data is color-converted into gradation data corresponding to the amounts of all the inks in seven colors consumed (S502). Then, the processing of conversion of number of gradation steps is performed on the image data obtained as the result of color conversion to generate half tone data which represents the state of formation of dots of all the inks in seven colors (S504). Interlace processing is performed on the half tone data to generate raster data in which the state of formation of dots of the C, M, Y, R, V, K, and Cl inks is represented is generated (S506). This raster data has additional information representing that dots of C, M, Y, R, V, K, and Cl are formed added thereto. Thereafter, the processing is branched according to the setting information 14c (S508). If the setting information 14c is the information of setting for using the Cl ink, the processing of S510 is performed by the first printing control unit. If the setting information 14c is the information of setting for avoiding the use of the Cl ink, the processing of S512 is performed by the second printing control unit.

Under the Cl use setting, the first printing control unit performs raster data send-out processing to directly output the raster data to the printer (S510), and the flow of operation is terminated. Then, the printer forms dots corresponding to the raster data on a printing medium on a raster-by-raster basis, using all the inks in seven colors according to the additional information, and thereby prints the print image. Thus, by outputting the generated raster data to the printer, control can be carried out so as to cause the printer to form dots of colored ink and uncolored ink to print a print image.

Under the Cl nonuse setting, the second printing control unit modifies the additional information into information for using only the C, M, Y, R, V, and K inks. Thereafter, the second printing control unit performs raster data send-out processing (S512). In this processing, of raster data in which the state of formation of dots of the C, M, Y, R, V, K, and Cl inks is represented, only raster data corresponding to the C, M, Y, R, V, and K colored inks is outputted to the printer. Then, the flow of operation is terminated. In other words, raster data for the Cl ink is not passed but only the raster data for the colored inks is passed from interlace processing to the printing device. Then, the printer forms dots corresponding to the raster data, using only the colored inks according to the additional information, and thereby prints the print image.

Thus, the color conversion processing, processing of conversion of number of gradation steps, and interlace processing performed by the first printing control unit and those performed by the second printing control unit can be made identical with each other. Therefore, programs for the printer driver to use the Cl ink can be used substantially without change to simplify these processing. Therefore, the common color conversion table can be referred to through a simple constitution regardless of whether to use the Cl ink. Thus, the storage capacity for color conversion tables can be reduced.

(7) Fifth Embodiment

Figure 12:
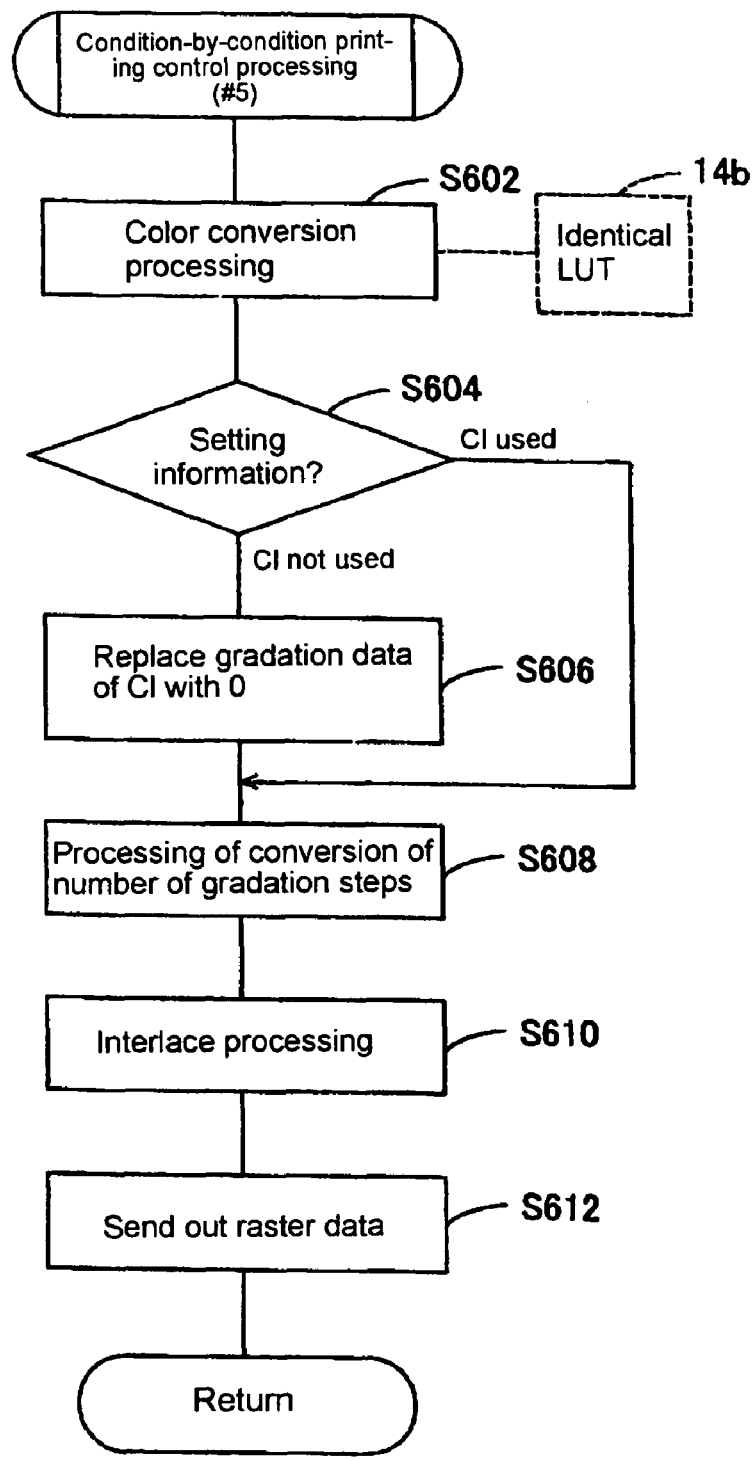
FIG. 12 is a flowchart illustrating the details of condition-by-condition printing control processing (#5) in a fifth embodiment.

FIG. 12 is a flowchart illustrating the details of the condition-by-condition printing control processing of S130 in the fifth embodiment. First, the identical color conversion LUT 14b is referred to regardless of whether to use the Cl ink. Thereby, the RGB data is color-converted into gradation data corresponding to the amounts of all the inks in seven colors consumed (S602). Thereafter, the processing is branched according to the setting information 14c (S604). If the setting information 14c is the information of setting for avoiding the use of the Cl ink, the following procedure is taken: of the image data obtained as the result of color conversion, only the gradation data corresponding to the amount of the Cl ink consumed is all replaced with gradation value 0. (Gradation value 0 is gradation data in which uncolored ink is not used.) Thereby, image data in which the Cl ink is prevented from being used is generated (S606), and the operation proceeds to S608. If the setting information 14c is the information of setting for using the Cl ink, S606 is skipped and the operation proceeds to S608.

At S608, the processing of conversion of number of gradation steps is performed on the image data obtained as the result of color conversion. (This image data includes the image data obtained as the result of replacement.) Thereby, half tone data which represents the state of formation of dots of the C, M, Y, R, V, K, and Cl inks is generated. Needless to add, if the gradation data for the Cl ink is replaced with 0, the data is converted into data in which the Cl ink is prevented from being used though the half tone data representing the state of formation of dots of the Cl ink exists. Thereafter, interlace processing is performed on the half tone data to generate intermediate raster data in which the state of formation of dots of the C, M, Y, R, V, K, and Cl inks is represented. Then, information which represents that the dots of C, M, Y, R, V, K, and Cl are formed is added or the like procedure is taken, and thereby, the ultimate raster data is generated (S610). Needless to add, if the gradation data for the Cl ink is replaced with 0, the data is converted into data in which the Cl ink is prevented from being used though the raster data representing the state of formation of dots of the Cl ink exists.

Raster data sent-out processing is performed to output the raster data to the printer (S612), and the flow of operation is terminated. Then, the printer forms dots corresponding to the raster data, and thereby prints the print image. If the gradation data for the Cl ink is replaced with 0, the Cl ink is not discharged and thus not used.

That is, the PC that performs only the processing of S602 to S604, and S608 to S612 constitutes the first printing control unit, and the PC that performs the processing of S602 to S604, and S608 to S612 as well as the processing of S606 constitutes the second printing control unit.

Thus, the color conversion processing, processing of conversion of number of gradation steps, and interlace processing performed by the first printing control unit and those performed by the second printing control unit can be made identical with each other. Therefore, programs for the printer driver to use the Cl ink can be used substantially without change to simplify these processing. Therefore, the common color conversion table can be referred to through a simple constitution regardless of whether to use the Cl ink. Thus, the storage capacity for color conversion tables can be reduced.

When the first to fifth embodiments described above are compared with one another, the following can be said:

The first embodiment is more useful than the second to fifth embodiments in that the speed of color conversion processing is enhanced; the first and second embodiments are more useful than the third to fifth embodiments in that the speed of the processing of conversion of number of gradation steps is enhanced; and the first to third embodiments are more useful than the fourth and fifth embodiments in that the speed of interlace processing is enhanced. The fourth and fifth embodiments are more useful than the first to third embodiments in that interlace processing can be made identical and simplified; the third to fifth embodiments are more useful than the first and second embodiments in that the processing of conversion of number of gradation steps can be made identical and simplified; and the second to fifth embodiments are more useful than the first embodiment in that color conversion processing can be made identical and simplified.

As described above, according to the present invention, the following can be provided in various embodiments: a printing control device, a printing system, a printing control method, a printing control program, a medium recording printing control program, and a printing control program product wherein if uncolored ink is not used in a printing device which can use uncolored ink, the storage capacity for color conversion tables can be reduced with little influence on the colors of print images.

What is claimed is:

1. A printing control device which carries out printing control corresponding to setting information representing the setting of whether to use uncolored ink on a printing device so designed to form dots on printing media by using colored ink containing coloring material and the uncolored ink containing no coloring material to print print images on the printing media, the printing control device comprising:

a first printing control unit which, when the setting information is the information of setting for using the uncolored ink, refers to a color conversion table in which the correspondence between gradation data corresponding to a plurality of component colors and gradation data corresponding to the amounts of the colored ink and the uncolored ink consumed is defined, thereby color-converts input image data comprising gradation data corresponding to a plurality of the component colors into image data comprising gradation data corresponding to the amounts of the colored ink and the uncolored ink consumed, performs predetermined half tone processing on the image data obtained as the result of color conversion, thereby generates half tone data representing a state of formation of dots having plural sizes for the colored ink and the uncolored ink, and carries out such control as to cause the printing device to form dots having plural sizes of the colored ink and the uncolored ink and print the print image using the half tone data including data representing the state of formation of dots having plural sizes for the uncolored ink; and a second printing control unit which, when the setting information is the information of setting for avoiding the use of the uncolored ink, refers to the identical color conversion table which holds the gradation data corresponding to the amount of the uncolored ink consumed, thereby color-converts the input image data into image data comprising gradation data corresponding to the amounts of the colored ink and the uncolored ink consumed, performs the predetermined half tone processing only on the gradation data corresponding to the amounts of the colored ink consumed by the image data obtained as the result of color conversion comprising gradation data corresponding to the amounts of the colored ink and the uncolored ink consumed, thereby generates half tone data representing a state of formation of dots having plural sizes for only the colored ink, and carries out such control as to cause the printing device to form dots having plural sizes of only the colored ink and print the print image using the half tone data representing the state of formation of dots having plural sizes for only the colored ink.

2. The printing control device according to claim 1, wherein an order control unit is provided which accepts the input of orders specifying whether to cause the printing device to use the uncolored ink, and takes the information corresponding to the accepted input of orders as the setting information.

3. The printing control device according to claim 1, wherein the identical color conversion table holds gradation data for the colored components corresponding to the amounts of the colored ink consumed and gradation data for the colorless component corresponding to the amount of the uncolored ink consumed, wherein the first printing control unit refers to the gradation data for the colored components in the color conversion table to acquire gradation data for the colored components corresponding to the input image data, refers to the gradation data for the colorless component in the color conversion table to acquire gradation data for the colorless component corresponding to the input image data, and generates image data after color conversion from the acquired gradation data for the colored components and gradation data for the colorless component, and wherein the second printing control unit refers to the gradation data for the colored components in the color conversion table to acquire gradation data for the colored components corresponding to the input image data, refers to the gradation data for the colorless component in the color conversion table to acquire gradation data for the colorless component corresponding to the input image data, generates image data after color conversion from the acquired gradation data for the colored components and gradation data for the colorless component, and performs the predetermined half tone processing only on the gradation data corresponding to the amounts of the colored ink consumed by the image data obtained as the result of color conversion comprising gradation data corresponding to the amounts of the colored ink and the uncolored ink consumed.

4. The printing control device according to claim 1, wherein the printing device is a device so designed to be fed with raster data which represents a state of formation of dots on a raster-by-raster basis and uses the colored ink and the uncolored ink to form dots corresponding to the raster data on printing media on a raster-by-raster basis and thereby print print images, wherein the first printing control unit performs predetermined half tone processing on the image data obtained as the result of color conversion comprising gradation data corresponding to the amounts of the colored ink and the uncolored ink consumed, thereby generates half tone data which represents the state of formation of dots of the colored ink and the uncolored ink, performs predetermined rasterize processing on the half tone data, thereby generates the raster data in which the state of formation of dots of the colored ink and the uncolored ink is represented, outputs the raster data to the printing device, and thereby causes the printing device to form dots of the colored ink and the uncolored ink and print the print image, and wherein the second printing control unit performs the predetermined half tone processing only on the image data obtained as the result of color conversion comprising gradation data corresponding to the amounts of the colored ink consumed, thereby generates half tone data which represents the state of formation of dots of only the colored ink, performs the rasterize processing on the half tone data, thereby generates raster data which represents the state of formation of dots of only the colored ink on a raster-by-raster basis, outputs only the raster data corresponding to the colored ink of the raster data to the printing device, and thereby causes the printing device to form dots of only the colored ink and print the print image.

5. A printing control method for carrying out printing control corresponding to setting information which represents the setting of whether to use uncolored ink on a printing device so designed to form dots on printing media by using colored ink containing coloring material and the uncolored ink containing no coloring material to print print images on the printing media, the method comprising:

a first printing control step in which, when the setting information is the information of setting for using the uncolored ink, a color conversion table in which the correspondence between gradation data corresponding to a plurality of component colors and gradation data corresponding to the amounts of the colored ink and the uncolored ink consumed is defined is referred to, thereby input image data comprising gradation data corresponding to a plurality of the component colors is color-converted into image data comprising gradation data corresponding to the amounts of the colored ink and the uncolored ink consumed, predetermined half tone processing is performed on the image data obtained as the result of color conversion, thereby half tone data representing a state of formation of dots having plural sizes for the colored ink and the uncolored ink is generated, and the printing device is caused to form dots having plural sizes for the colored ink and the uncolored ink and print the print image using the half tone data including data representing the state of formation of dots having plural sizes for the uncolored ink; and a second printing control step in which, when the setting information is the information of setting for avoiding the use of the uncolored ink, the identical color conversion table which holds the gradation data corresponding to the amount of the uncolored ink consumed is referred to, thereby the input image data is color-converted into image data comprising gradation data corresponding to the amounts of the colored ink and the uncolored ink consumed, the predetermined half tone processing is performed only on the gradation data corresponding to the amounts of the colored ink consumed by the image data obtained as the result of color conversion comprising gradation data corresponding to the amounts of the colored ink and the uncolored ink consumed, thereby half tone data representing a state of formation of dots having plural sizes for only the colored ink is generated, and the printing device is caused to form dots having plural sizes of only the colored ink and print the print image using the half tone data representing the state of formation of dots having plural sizes for only the colored ink.

6. A non-transitory computer-readable storage medium having stored thereon a printing control program for causing a computer to carry out the function of performing printing control corresponding to setting information which represents whether to use uncolored ink on a printing device so designed to form dots on printing media by using colored ink containing coloring material and the uncolored ink containing no coloring material to print images on the printing media, which program implements: a first printing control function with which, when the setting information is the information of setting for using the uncolored ink, a color conversion table in which the correspondence between gradation data corresponding to a plurality of component colors and gradation data corresponding to the amounts of the colored ink and the uncolored ink consumed is defined is referred to, thereby input image data comprising gradation data corresponding to a plurality of the component colors is color-converted into image data comprising gradation data corresponding to the amounts of the colored ink and the uncolored ink consumed, predetermined half tone processing is performed on the image data obtained as the result of color conversion, thereby half tone data representing a state of formation of dots having plural sizes for the colored ink and the uncolored ink is generated, and carries out such control as to cause the printing device to form dots having plural sizes for the colored ink and the uncolored ink and print the print image using the half tone data including data representing the state of formation of dots having plural sizes for the uncolored ink; and a second printing control function with which, when the setting information is the information of setting for avoiding the use of the uncolored ink, the identical color conversion table which holds the gradation data corresponding to the amount of the uncolored ink consumed is referred to, thereby the input image data is color-converted into image data comprising gradation data corresponding to the amounts of the colored ink and the uncolored ink consumed, the predetermined half tone processing is performed only on the gradation data corresponding to the amounts of the colored ink consumed by the image data obtained as the result of color conversion comprising gradation data corresponding to the amounts of the colored ink and the uncolored ink consumed, thereby half tone data representing a state of formation of dots having plural sizes for only the colored ink is generated, and the printing device is caused to form dots having plural sizes of only the colored ink and print the print image using the half tone data, representing the state of formation of dots having plural sizes for only the colored ink.

7. The printing control device according to claim 1,
wherein the first printing control unit generates half tone data which represents the state of formation of large, medium, and small dots of the colored ink and the uncolored ink, and carries out such control as to cause the printing device to form the large, medium, and small dots of the colored ink and the uncolored ink and print the print image using the half tone data which represents the state of formation of the large, medium, and small dots of the colored ink and the uncolored ink,
and wherein the second printing control unit generates half tone data which represents the state of formation of large, medium, and small dots of only the colored ink, and carries out such control as to cause the printing device to form the large, medium, and small dots of only the colored ink and print the print image using the half tone data which represents the state of formation of the large, medium, and small dots of only the colored ink.

* * * * *